United States Patent
Kometani et al.

(10) Patent No.: US 6,273,704 B1
(45) Date of Patent: Aug. 14, 2001

(54) CASTING APPARATUS FOR FORMATION OF RESIN-MADE MEMBRANE

(75) Inventors: Hideo Kometani; Hidetoshi Kitajima; Takuya Gotou; Haruki Nakao; Daisuke Ooi, all of Aichi-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/061,259

(22) Filed: Apr. 17, 1998

(30) Foreign Application Priority Data

Apr. 21, 1997 (JP) .................................. 9-103584

(51) Int. Cl.$^7$ .......................... B05C 1/00; B29C 47/16
(52) U.S. Cl. ........................ 425/224; 118/101; 118/202; 425/66; 425/278.1; 425/DIG. 16
(58) Field of Search ................. 425/224, 376.1, 425/377, DIG. 16, 378.1, 461, 66; 264/211.12, 150; 118/69, 101, 202, 50

(56) References Cited

U.S. PATENT DOCUMENTS

| | | | |
|---|---|---|---|
| 2,688,155 | * 9/1954 | Nadeau et al. | 264/212 |
| 3,347,962 | * 10/1967 | Dieck et al. | 264/556 |
| 3,579,735 | * 5/1971 | Metz, Jr. | 425/224 |
| 4,310,295 | 1/1982 | Heyer . | |
| 4,545,321 | * 10/1985 | Bassa | 118/50 |
| 5,154,951 | * 10/1992 | Finnicum et al. | 427/402 |
| 5,618,568 | * 4/1997 | Krupa et al. | 425/224 |
| 5,676,381 | * 10/1997 | Buzzoni et al. | 277/34 |

FOREIGN PATENT DOCUMENTS 2 698 580 * 6/1994 (FR) .
63-57222 11/1988 (JP) .

* cited by examiner

Primary Examiner—Nam Nguyen
Assistant Examiner—Emmanuel S. Luk
(74) Attorney, Agent, or Firm—Armstrong, Westerman, Hattori, McLeland, & Naughton, LLP

(57) ABSTRACT

The present invention relates to a casting apparatus for formation of a resin-made membrane which is made to be capable of accomplishing a stable pressure reduction through a suction chamber irrespective of the dimension of an interval between a die and a cooling roll. Thus, in the apparatus according to this invention, a suction chamber is disposed independently of a die and is located to define a necessary seal gap with respect to a cooling roll. Further, a circumferentially moving mechanism is provided to shift the suction chamber along the circumferential directions of the cooling roll while maintaining the necessary seal gap. This invention is applicable, for example, to a biaxial oriented film machine, a non-oriented film machine, a sheet machine, and others.

66 Claims, 31 Drawing Sheets

F I G. 27
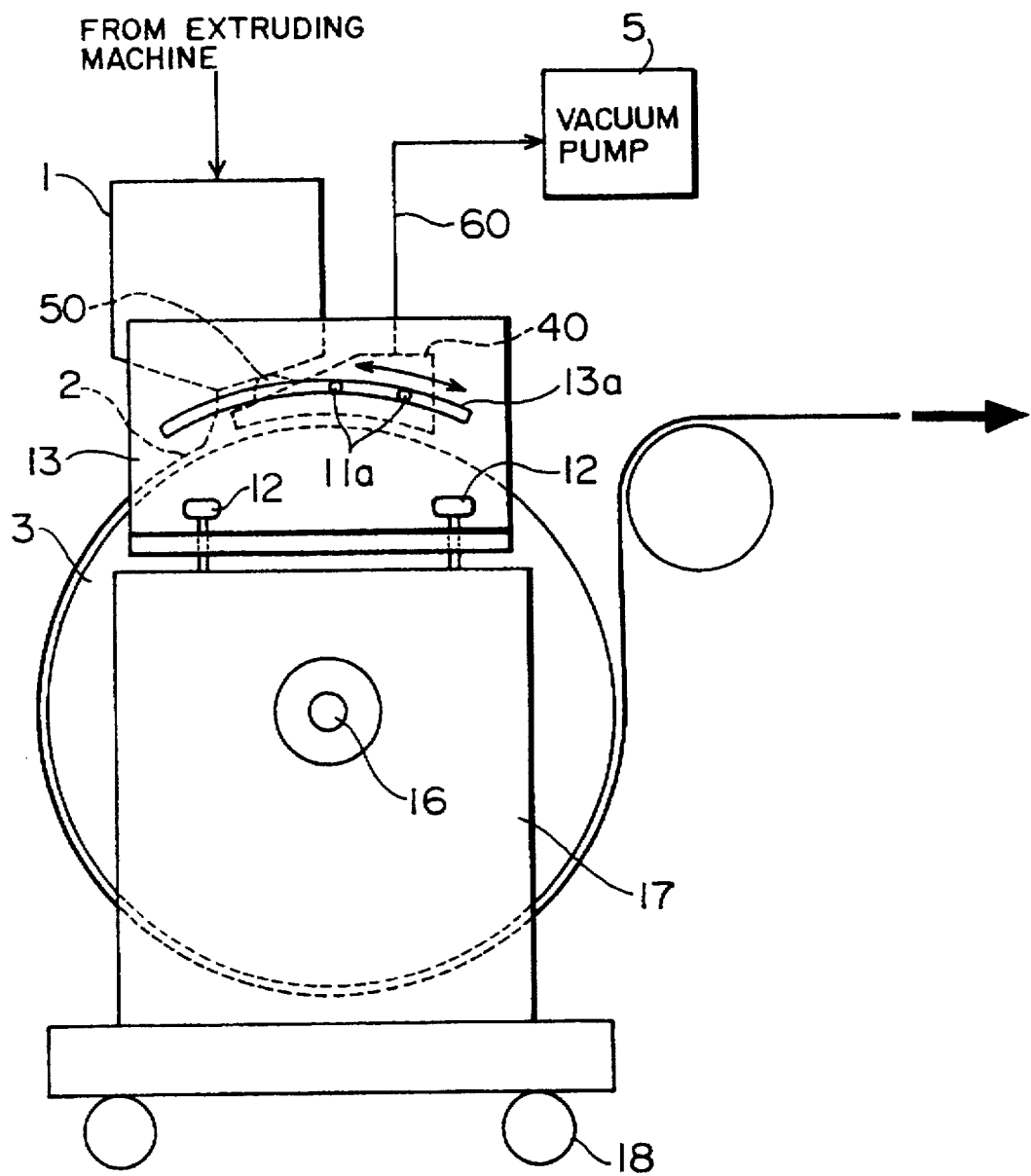

CASTING APPARATUS FOR FORMATION OF RESIN-MADE MEMBRANE

BACKGROUND OF THE INVENTION

1) Field of the Invention

The present invention is for the purpose of forming a film-like or sheet-like resin-made membrane (signifying a thin-film), and relates to a resin-made membrane formation casting apparatus suitably used, for example, as a biaxial oriented film machine, a non-oriented film machine, a sheet machine, and others.

2) Description of the Related Art

FIGS. 31 and 32 are respectively a side elevational view and a front elevational view each illustratively showing a prior resin-made membrane formation casting apparatus. Although FIG. 32 shows only one end portion side of the prior apparatus in its width direction, the other end portion side is constructed in a similar way.

As shown in FIGS. 31 and 32, the prior apparatus is equipped with a T die 101 for extruding a molten resin from an extruding machine (not shown) into a film-like or sheet-like membrane 102, a casting roll (cooling roll) 103 for receiving the membrane 102 extruded from the T die 101 on its outer circumferential surface to cool and deliver the membrane 102, and a suction chamber (vacuum box) 104 for stably making the membrane 102 come closely into contact with the surface of the casting roll 103.

In this constitution, the casting roll 103 is supported by a roll supporting shaft 106 to be rotatable with respect to a side frame 107.

The suction chamber 104 is fixedly secured on one side surface of the T die 101. Further, a vacuum pump 105 is in a coupled relation to the suction chamber 104 so that, when this vacuum pump 105 is placed into operation, the air between the membrane 102 and the casting roll 103 is sucked through an opening section 104a of the suction chamber 104.

The opening section 104a is made throughout the overall width of the membrane 102 in the proximity of a portion where the membrane 102 starts to come closely into contact with the outer circumferential surface of the casting roll 103. Further, a seal gap 104b is defined between the suction chamber 104 and the casting roll 103. The dimension of the seal gap 104b is set to ensure a required suction force (pressure reduction level) at the close contact section between the membrane 102 and the casting roll 103 concurrently with allowing the rotation of the casting roll 103. In FIGS. 31 and 32, reference numeral 108 represents wheels to be used when shifting this apparatus.

With the above-mentioned constitution, the resin molten by the non-shown extruding machine passes through the T die 101 to be extruded into a film-like or sheet-like membrane 102 which in turn, is placed on the outer circumferential surface of the casting roll 103 to be cooled for formation.

At this time, the air within the suction chamber 104 is sucked by the vacuum pump 105 so that the air in the close contact section between the membrane 102 and the casting roll 103 is sucked through the opening section 104a of the suction chamber 104. Whereupon, that close contact section is pressure-reduced to discharge the air taken in between the membrane 102 and the casting roll 103, with the result that the membrane 102 made of the molten resin can stably be brought into contact with the casting roll 103.

In this case, depending upon the kind of resin, on the condition that an interval between the T die 101 and the casting roll 103 is small, the orientation of the molten resin due to its extension is not relieved, but the resin is cooled and solidified on the casting roll 103, and hence, a necessary film characteristic (membrane characteristic) is unobtainable. In addition, under the condition that the interval between the T die 101 and the casting roll 103 is small, the microscopic surface irregularities occurring at the exit of the T die 101 is unreducible in the extension interval, and after being cooled and solidified, they remain as the surface roughness, thereby deteriorating the film quality (membrane quality).

Accordingly, a way of varying the interval between the T die 101 and the casting roll 103 in accordance with kinds of resins can be taken in order to attain the necessary film characteristic (membrane characteristic). However, in the prior apparatus shown in FIGS. 31 and 32, since the suction chamber 104 is fixed with respect to the T die 101, difficulty is encountered to vary the interval between the T die 101 and the casting roll 103.

For instance, even if, in the prior apparatus shown in FIGS. 31 and 32, the casting roll 103 is lowered to enlarge the interval between the T die 101 and the casting roll 103, the seal gap 104b between the suction chamber 104 and the casting roll 103 results in enlargement to make it difficult to obtain a necessary suction force, so that the removal of the air taken in between the membrane 102 and the casting roll 103 becomes impossible, with the result that it is impossible to stably make the membrane 102 come closely into contact with the casting roll 103.

Furthermore, according to an experiment, in the case of forming the membrane 102 through the use of a casting apparatus based upon the above-mentioned suction chamber 104, the configuration of the vacuum space defined by the membrane-like molten resin immediately after being discharged from the T die 101, the outer circumferential surface of the casting roll 103 and the tip portion of the suction chamber 104, or the occurrence or non-occurrence of the flow of the outside air into that vacuum space, has influence on the stably closely contacting condition of the membrane 102 with the casting roll 103 in accordance with the conditions such as the kind of resin material being, the resin viscosity when molten, the thickness of the membrane 102 and the formation speed. Particularly, in the case of a resin with a relatively low extension viscosity, the outside-air flow situation into the vacuum space affects the stably close contact of the membrane 102 with the casting roll 103.

For this reason, troubles take place; for example, the membrane 102 vibrates (swings) or is brought into the interior of the suction chamber 104, and particularly in the case of high-speed formation of the membrane 102, that influence becomes more serious. For example, FIG. 33 shows an outside-air inflow situation (the dotted arrows denote air flows) in a cross section taken along a line S—S of FIG. 31, and, as shown in FIG. 33, the membrane 102 vibrates (swings) or is brought into the interior of the suction chamber 104 due to the occurrence of the dynamic pressure at a portion designated at B2 and the eddy caused by the suction at a portion depicted at B1, which hinders the speed-up of the membrane formation.

SUMMARY OF THE INVENTION

The present invention has been developed with a view to eliminating the above-mentioned problems, and it is therefore an object of this invention to provide a casting apparatus for resin-made membrane formation which is capable of accomplishing the stable pressure reduction by a suction chamber without depending upon the dimension of the interval between a die and a cooling roll and of appropriately setting the interval between the die and the cooling roll irrespective of the kind of resin being employed so that the necessary membrane characteristic is securable to improve the quality of a resin-made membrane.

For this purpose, in accordance with the present invention, a casting apparatus for resin-made membrane formation comprises a die for extruding a molten resin into a membrane, a cooling roll for receiving the membrane extruded from the die on its outer circumferential surface to deliver it while cooling, and a suction chamber for sucking air between the membrane and the cooling roll so that the membrane is brought closely into contact with the surface of the cooling roll, wherein the suction chamber is disposed independently of the die and is located to define a necessary seal gap with respect to the cooling roll, and a mechanism for imparting circumferential is further provided to move the suction chamber in a circumferential direction with respect to the cooling roll in a state of maintaining the necessary seal gap.

The following mechanisms (1) to (3) can be employed as the mechanism for imparting circumferential movement to the suction chamber:

(1) A mechanism having a driving member in which its proximal side is supported to be rotatable around a rotary shaft of the cooling roll and the suction chamber is fixedly secured to its tip side;

(2) A mechanism having a guide member which is attached to a side frame for rotatably supporting a side end portion of the cooling roll and is made to guide the suction chamber along a circumferential direction of the cooling roll; and (3) A mechanism having a driving member in which its proximal side is supported to be rotatable around a rotary shaft of the cooling roll and further having a guide member attached to a tip side of this driving member to guide the suction chamber along a circumferential direction of the cooling roll.

On the other hand, it is also appropriate to provide a radially driving mechanism for shifting the suction chamber in a radial direction of the cooling roll to adjust the necessary seal gap.

The circumferentially moving mechanism and the radially moving mechanism can take the following structures (4) to (6):

(4) A circumferentially moving mechanism is equipped with a driving member in which its proximal side is supported to be rotatable around a rotary shaft of the cooling roll and the suction chamber is fixedly secured to its tip side, while a radially moving mechanism is provided at a portion where the suction chamber is fitted to the driving member;

(5) A circumferentially moving mechanism is equipped with a guide member attached to a side frame for rotatably supporting a side end portion of the cooling roll and made to guide the suction chamber along a circumferential direction of the cooling roll, whereas a radially moving mechanism is constructed as a mechanism for shifting the guide member along, a radial direction of the cooling roll; and (6) A circumferentially moving mechanism is equipped with a driving member in which its proximal side is supported to be rotatable around a rotary shaft of the cooling roll and a guide member fitted to a tip side of the driving member to guide the suction chamber along a circumferential direction of the cooling roll, whereas a radially moving mechanism is provided at a portion where the guide member is attached to the driving mechanism.

Besides, it is also possible that an elastic seal member is interposed between the die and the suction chamber.

In this case, it is possible that the elastic seal member is disposed throughout a width exceeding the overall width of the membrane, and is composed of a bar-like elastic seal body based on a foaming agent and formed by covering the whole surface of the foaming agent with a glass cloth coated with an aluminium foil and a fixture for fixing the elastic seal body to the suction chamber or the die, and further is made to close the gap between the die and the suction chamber in a manner that the elastic seal body is pressed against the die or the suction chamber with an elastic force to come into contact therewith. In addition, it is also possible that the elastic seal member is disposed throughout a width exceeding the overall width of the membrane, and is made up of a metallic plate spring with a corrosion resistance which is attached to the suction chamber or the die, and further is made to close the gap between the die and the suction chamber in a manner that the metallic plate spring is pressed against the die or the suction chamber with an elastic force to come into contact therewith.

Moreover, a shielding plate capable of shielding an end portion of a suction opening section of the suction chamber can be provided to be movable in a width direction of the membrane. A suction nozzle can also be provided to suck air from an end portion side direction of a suction opening section of the suction chamber. Besides, it is also appropriate that a shielding plate capable of shielding an end portion of a suction opening section of the suction chamber can be provided to be movable in a width direction of the membrane and further a suction nozzle is provided to suck air from an end portion side direction of the suction opening section of the suction chamber.

As described above, in the resin-made membrane formation casting apparatus according to this invention, the suction chamber is separated from the die and is provided independently of the die, and the suction chamber is designed to be moved along the circumferential direction of the cooling roll by the circumferentially moving mechanism while the necessary seal gap is maintained between the suction chamber and the cooling roll.

In the case of the use of the circumferentially moving mechanism having the driving member made such that its proximal side is supported to be rotatable around the rotary shaft of the cooling roll and the suction chamber is fixedly secured to its tip side, the suction chamber can be moved in the circumferential direction of the cooling roll in a manner that the driving member is rotated around the rotary shaft of the cooling roll.

Furthermore, in the case of the use of the circumferentially moving mechanism having the guide member fitted to the side frame rotatably supporting the side end portion of the cooling roll to guide the suction chamber along the circumferential direction of the cooling roll, the cooling roll can be shifted in the circumferential direction of the cooling roll by means of guiding the suction chamber along the guide member.

Still further, through the use of the circumferentially moving mechanism having the driving member in which its proximal side is supported to be rotatable around the rotary shaft of the cooling roll and further having the guide member attached to the tip side of the driving member to guide the suction chamber in the circumferential direction of the cooling roll, the suction chamber can be shifted in the circumferential direction of the cooling roll in a manner that the driving member is rotated around the rotary shaft of the cooling roll and the suction chamber is guided along the guide member.

Accordingly, in case where the interval between the die and the cooling roll is large, when the suction chamber is shifted in the circumferential direction by the circumferentially moving mechanism to make the suction inlet (opening section) of the suction chamber approach the close-contact starting section between the membrane and the cooling roll, regardless of the dimension of the interval between the die and the cooling roll, the necessary pressure reduction level is securable, with the result that the pressure reduction of the space between the membrane and the cooling roll can stably be done by the suction chamber. Whereupon, it becomes possible to appropriately set the interval between the die and the cooling roll for any kind of resin, which ensures the necessary membrane characteristic to sharply enhances the quality of the resin-made membrane.

In this case, if the elastic seal member is put between the die and the suction chamber, even if the variation of the dimension of the interval between the die and the cooling roll or the position of the suction chamber takes place, the elastic seal member can close the gap between the die and the suction chamber following that variation, with the result that the airtightness of the pressure reduction space surrounded by the die, the membrane and the suction chamber is securable so that the necessary pressure reduction level is surely obtainable in that pressure reduction space.

Furthermore, if the elastic seal member is disposed throughout a width exceeding the overall width of the membrane and is pressed against the die with an elastic force to come into contact therewith to close the gap between the die and the suction chamber, irrespective of the variation of the position of the suction chamber, the elastic member can automatically and certainly close the interval between the suction chamber and the die, and therefore, the airtightness of the pressure reduction space surrounded by the die, the membrane and the suction chamber is securable, thereby surely providing the necessary pressure reduction level in the pressure reduction space. In addition, at the positional adjustment of the suction chamber for obtaining the optimal condition which is done prior to the start of each membrane production operation, it is possible to certainly prevent the vibrations of the membrane occurring because of the air flow into the suction chamber through the interval between the suction chamber and the die, with the result that the adjustment work becomes extremely easy and the production operation can be conducted immediately after the adjustment work.

On the other hand, in another casting apparatus for resin-made membrane formation according to this invention, the suction chamber is movable in the circumferential and radial directions of the cooling roll in a state where the seal gap is maintainable between the suction chamber and the cooling roll and the seal gap between the suction chamber and the cooling roll is adjustable, and further, that gap can be sealed with the elastic seal member irrespective of the dimension of the interval between the die and the suction chamber.

Accordingly, since the pressure reduction of the gap between the membrane and the cooling roll is stably achievable by the suction chamber regardless of the dimension of the interval between the die and the cooling roll, the interval between the die and the cooling roll can adequately be set for any kind of resin, which ensures the necessary membrane characteristic to sharply improve the quality of the resin-made membrane.

In addition, if using the shielding plate capable of shielding the end portion of the suction opening section of the suction chamber or the suction nozzle made to suck the air from the end portion side direction of the suction opening section of the suction chamber, the main flow into the space defined by the membrane extruded from the die, the cooling roll and the suction chamber due to the suction is controllable, so that it is possible to suppress the vibrations (swinging) of the membrane or the introduction of the membrane into the suction chamber, with the result that the stable membrane formation is feasible for any kind of resin.

BRIEF DESCRIPTION OF THE DRAWINGS

FIG. 27 is aside elevational view illustratively showing a casting apparatus for resin-made membrane formation according to an eleventh embodiment of this invention;

DESCRIPTION OF THE PREFERRED EMBODIMENTS

Embodiments of the present invention will be described hereinbelow with reference to the drawings.

[1] Description of First Embodiment

Figure 1:
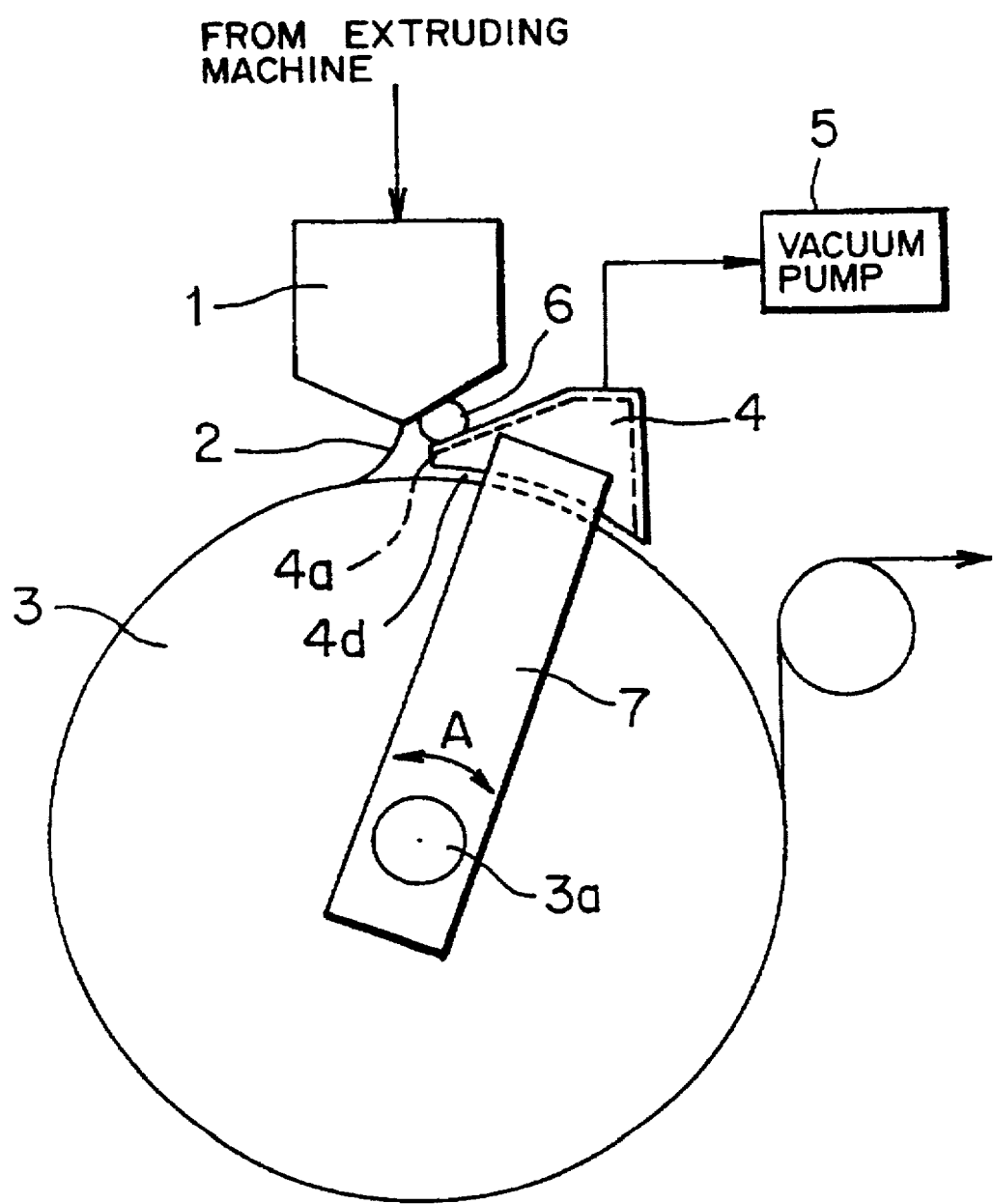
FIG. 1 is a side elevational view illustratively showing a casting apparatus for resin-made membrane formation according to a first embodiment of the present invention.

FIG. 1 is a side elevational view illustratively showing a casting apparatus for resin-made membrane formation according to a first embodiment of the present invention, and as shown in FIG. 1, the casting apparatus according to the first embodiment is also composed of a T die (die) 1 for extruding a resin molten by an extruding machine (not shown) into a film-like or sheet-like membrane (thin-film) 2, a casting roll (cooling roll) 3 for receiving the membrane 2 extruded from the T die 1 on its outer circumferential surface to cool and deliver it, and a suction chamber 4 for sucking air between the membrane 2 and the casting roll 3 to make the membrane 2 stably come closely into contact with the surface of the casting roll 3.

In this embodiment, the suction chamber 4 is provided independently of the T die 1. Further, the suction chamber 4 is formed along the outer circumferential surface of the casting roll 3, and a necessary seal gap $4d$ is defined between the suction chamber 4 and the outer circumferential surface of the casting roll 3. The dimension (interval) of this seal gap $4d$ is set to ensure a necessary suction force (pressure reduction level) at a close contact section between the membrane 2 and the casting roll 3 while allowing the rotation of the casting roll 3.

Besides, as well as the prior art, a vacuum pump 5 is in communication with the suction chamber 4, and on the operation of this vacuum pump 5, the air between the membrane 2 and the casting roll 3 is sucked through an opening section $4a$ of the suction chamber 4. Further, the opening section $4a$ (suction inlet) is made throughout the overall width of the membrane 2 in the proximity of the portion where the membrane 2 starts to come closely into contact with the outer circumferential surface of the casting roll 3.

In addition, in this embodiment, a driving member 7 is used as a circumferentially moving mechanism designed to move the suction chamber 4 along a circumferential direction of the casting roll 3 while maintaining the necessary seal gap $4d$. This driving member 7 is made such that its proximal side supported coaxially with a roll supporting shaft (rotary shaft) $3a$ of the casting roll 3 to be rotatable around the roll supporting shaft $3a$ (in directions of arrows A in FIG. 1) while its tip side is in a fixed relation to the suction chamber 4.

Furthermore, an elastic seal body (elastic seal member) 6 is interposed between the T die 1 and the suction chamber 4, and the gap between the T die 1 and the suction chamber 4 is sealed by the effect of the elastic seal body 6.

Since the resin-made membrane formation casting apparatus according to the first embodiment of this invention is constructed as mentioned above, a resin molten by the non-shown extruding machine is extruded from the T die 1 into a film-like or sheet-like membrane 2 which in turn, is taken on the outer circumferential surface of the casting roll 3 to be cooled for formation.

At this time, if the vacuum pump 5 sucks the air within the suction chamber 4, the air in the close contact section between the membrane 2 and the casting roll 3 is sucked through the opening section $4a$ of the suction chamber 4. Whereupon, the space close to that close-contact section is pressure-reduced to discharge the air taken in between the membrane 2 and the casting roll 3, so that the membrane 2 made of a molten resin can stably be brought into close contact with the casting roll 3.

Now, consideration is given to a case of varying the interval between the T die 1 and the casting roll 3 in accordance with the kind of resin in order to attain a necessary film characteristic (membrane characteristic). For instance, by retreating (lowering) the casting roll 3, it is possible to enlarge the gap (interval) between the T die 1 and the casting roll 3. On the contrary, in the case of the prior apparatus, when only retreating the casting roll 3, in addition to the enlargement of the interval between the membrane 2 and the opening section 4a of the suction chamber 4, the seal gap 4d between the suction chamber 4 and the casting roll 3 increases, which makes it difficult to bring the space (pressure reduction space) near the close contact section between the membrane 2 and the casting roll 3 to a necessary pressure reduction level.

In this embodiment, the suction chamber 4 is separated from the T die 1 and disposed independently of the T die 1, and through the use of the driving member 7, the suction chamber 4 is movable along the circumferential directions of the casting roll 3 in a state where the necessary seal gap 4d is maintained between the suction chamber 4 and the casting roll 3.

Thus, in the case that the interval between the T die 1 and the casting roll 3 is large, the suction chamber 4 is shifted by the driving member 7 counterclockwise around the roll supporting shaft 3a to advance to a given position so that the suction inlet (opening section 4a) of the suction chamber 4 approaches the close-contact starting section between the membrane 2 and the casting roll 3, with the result that the interval between the membrane 2 and the opening section 4a of the suction chamber 4 decreases. On the contrary, in the case that the interval between the T die 1 and the casting roll 3 is small, the suction chamber 4 is shifted by the driving member 7 clockwise around the roll supporting shaft 3a to retreat up to a given position.

Moreover, at this time, since the suction chamber 4 is formed along the outer circumferential surface of the casting roll 3, even if the suction chamber 4 is rotated by the driving member 7, the necessary seal gap 4d is always maintainable between the suction chamber 4 and the casting roll 3.

Because of setting the position of the suction chamber 4 and maintaining the seal gap 4d as mentioned above, without depending upon the dimension of the interval between the T die 1 and the casting roll 3, the necessary pressure reduction level is attainable in the pressure reduction space, so that the pressure reduction in the space between the membrane 2 and the casting roll 3 is stably achievable by the suction chamber 4.

Furthermore, in a manner of varying the dimension of the interval between the T die 1 and the casting roll 3 or the position of the suction chamber 4 as mentioned above, since in this embodiment the elastic seal body 6 is interposed between the T die 1 and the suction chamber 4, even if the interval (gap) between the T die 1 and the suction chamber 4 varies, the elastic seal member closes the gap between the T die 1 and the suction chamber 4 in accordance with the variation. Whereupon, the airtightness of the pressure reduction space surrounded by the T die 1, the membrane 2 and the suction chamber 4 is maintainable so that the necessary pressure reduction level is certainly obtainable in that pressure reduction space.

Incidentally, the rotating operation of the suction chamber 4 by rotationally driving the driving member 7 around the roll supporting shaft 3a can rely on a manual operation and can be through a non-shown driving mechanism (drive motor).

As described above, in the casting apparatus for resin-made membrane formation according to the first embodiment of this invention, regardless of the dimension of the interval between the T die 1 and the casting roll 3, the pressure reduction in the space between the membrane 2 and the casting roll 3 is stably achievable by the suction chamber 4, and therefore, it is possible to appropriately set the interval between the T die 1 and the casting roll 3 with respect to any kind of resin, with the result that the necessary film characteristic (membrane characteristic) is securable to sharply improve the quality of the resin-made membrane (film or sheet) 2.

[2] Description of Second Embodiment

Figure 2:
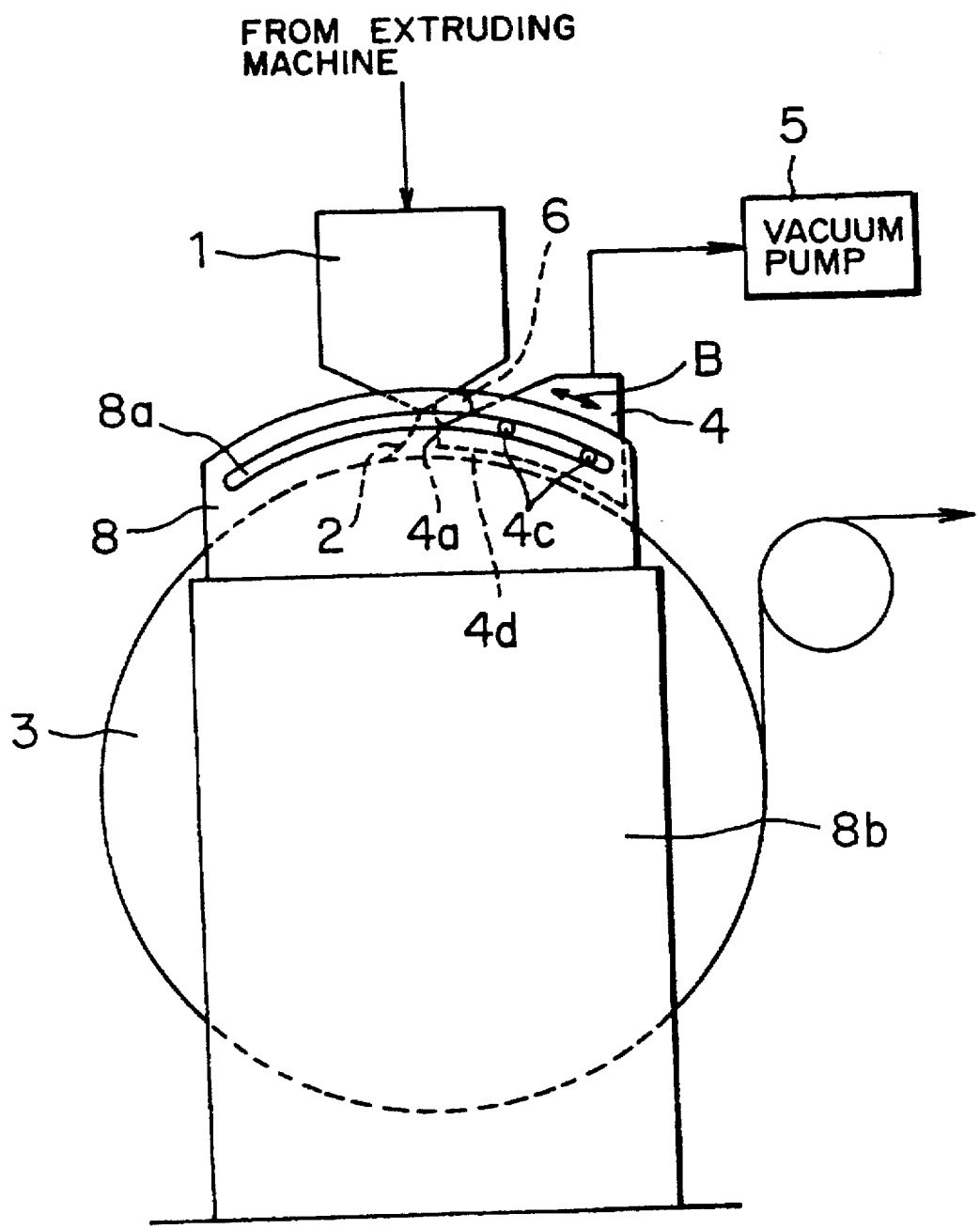
FIG. 2 is a side elevational view illustratively showing a casting apparatus for resin-made membrane formation according to a second embodiment of this invention.

FIG. 2 illustratively shows a casting apparatus for resin-made membrane formation according to a second embodiment of this invention. Although the casting apparatus according to the second embodiment has the substantially same construction as that of the apparatus according to the first embodiment as shown in FIG. 2, in the second embodiment, a guide member 8 is employed as a circumferentially moving mechanism made to shift a suction chamber 4 along the circumferential directions of a casting roll 3 in a state where a necessary seal gap 4d is kept.

This guide member 8 is fitted to a side frame 8b made to rotatably support a side end portion of the casting roll 3. The guide member 8 has an elongated hole-like guide rail 8 a made to engage with two pins (rollers) 4c, 4c fitted onto a side surface of the suction chamber 4 to guide the suction chamber 4 along circumferential directions (in directions of arrows B in FIG. 2) of the casting roll 3.

In the casting apparatus according to the second embodiment, the structure other than the aforesaid circumferentially moving mechanism is the same as that of the first embodiment, and hence, the description thereof will be omitted.

Since the resin-made membrane formation casting apparatus according to the second embodiment of this invention is constructed as mentioned above, in the case that the interval between the T die 1 and the casting roll 3 is large, the suction chamber 4 is shifted counterclockwise (in the left-hand direction in FIG. 2) along the elongated hole-like guide rail 8a of the guide member 8 to advance to a given position so that the suction inlet (opening section 4a) of the suction chamber 4 approaches the close contact starting portion between the membrane 2 and the casting roll 3, thereby shortening the interval between the membrane 2 and the opening section 4a of the suction chamber 4. On the contrary, when the interval between the T die 1 and the casting roll 3 is small, the suction chamber 4 is moved clockwise (in the right-hand direction in FIG. 2) along the elongated hole-like guide rail 8a of the guide member 8 to retreat to a given position.

In addition, as in the case of the first embodiment, since the suction chamber 4 is formed along the outer circumferential surface of the casting roll 3, although the suction chamber 4 moves along the elongated hole-like guide rail 8a of the guide member 8, the necessary seal gap 4d is always held between the suction chamber 4 and the outer circumferential surface of the casting roll 3.

Incidentally, the movement of the suction chamber 4 along the guide rail 8a can manually done or conducted through the use of a driving mechanism (not shown).

Thus, the resin-made membrane formation casting apparatus according to the second embodiment of this invention can also offer the same effects as those of the first embodiment.

[3] Description of Third Embodiment

Figure 3:
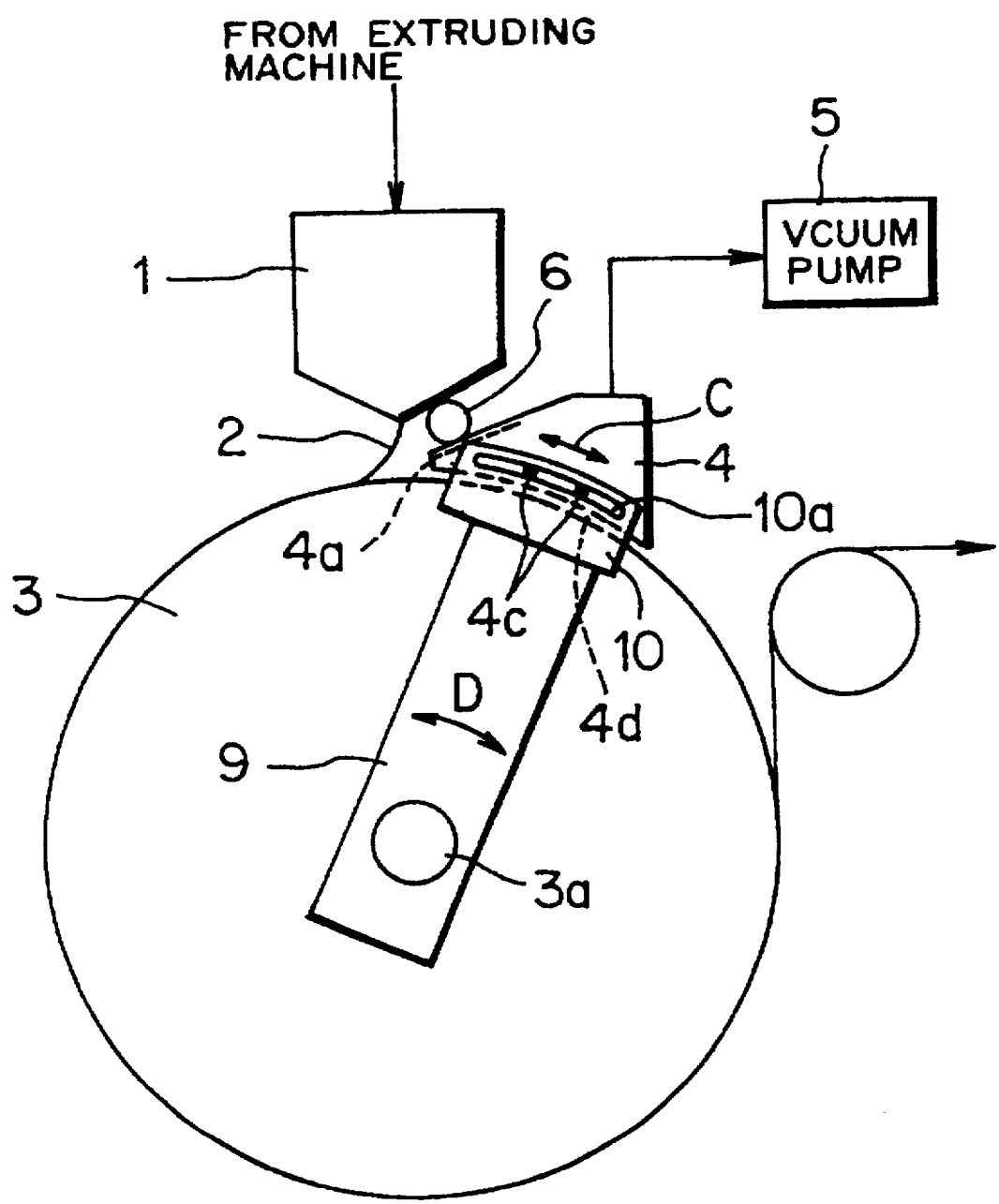
FIG. 3 is a side elevational view illustratively showing a casting apparatus for resin-made membrane formation according to a third embodiment of this invention.

FIG. 3 illustratively shows a casting apparatus for resin-made membrane formation according to a third embodiment of this invention. Although the casting apparatus has the substantially same structure as that of the first embodiment as shown in FIG. 3, in the third embodiment, a driving member 9 and a guide member 10 are used as the circumferentially moving mechanism which moves a suction chamber 4 along circumferential directions of a casting roll 3 while keeping a necessary seal gap 4d.

In this case, the driving member 9 is designed such that its proximal side is supported coaxially with a roll supporting shaft (rotary shaft) 3a of the casting roll 3 to be rotatable around the roll supporting shaft 3a (in directions of arrows D in FIG. 3) while the guide member 10 is attached to its tip side. This guide member 10 has an elongated hole-like guide rail 10a made to engage with two pins (or rollers) 4c, 4c fitted onto a side surface of the suction chamber 4 to guide the suction chamber 4 along circumferential directions of the casting roll 3 (in directions of arrows C in FIG. 3).

Since the resin-made membrane formation casting apparatus according to the third embodiment of this invention is constructed as mentioned above, when the interval between the T die 1 and the casting roll 3 is of a great dimension, the suction chamber 4 is first shifted by the driving member 9 counterclockwise around the roll supporting shaft 3a to proceed to an appropriate position for rough adjustment and the suction chamber 4 is then moved along the elongated hole-like guide rail 10a of the guide member 10 to be positioned at a given position for fine adjustment, so that the suction inlet (opening section 4a) of the suction chamber 4 is positioned in the vicinity of the close-contact starting portion between the membrane 2 and the casting roll 3.

On the contrary, when the interval between the T die 1 and the casting roll 3 is of a small dimension, the rough adjustment is first made such that the suction chamber 4 is moved by the driving member 9 clockwise around the roll supporting shaft 3a to retreat to an appropriate position and subsequently the fine adjustment is made such that the suction chamber 4 is shifted along the elongated hole-like guide rail 10a of the guide member 10 to be positioned at a given position.

In addition, at this time, as in the case of the first embodiment, since the suction chamber 4 is formed along the outer circumferential surface of the casting roll 3, although the suction chamber 4 is rotated by the driving member 9 and although being shifted along the elongated hole-like guide rail 10a of the guide member 10, the necessary seal gap 4d stays between the suction chamber 4 and the outer circumferential surface of the casting roll 3.

Incidentally, the rotation of the suction chamber 4 by rotationally driving the driving member 9 around the roll supporting shaft 3a can rely on a manual operation and can be through a non-shown driving mechanism (drive motor). Likewise, the movement of the suction chamber 4 around the guide rail 10a can rely on a manual operation and can be through a non-shown driving mechanism.

Thus, the resin-made membrane formation casting apparatus according to the third embodiment of this invention can also obtain the same effects as those of the first embodiment, and since in the third embodiment the positioning of the suction chamber 4 is made through the two steps of the rough adjustment by the driving member 9 and the fine adjustment by the guide member 10, the positioning is achievable with a high accuracy.

Although in the above-described first to third embodiments the elastic seal body 6 closes the gap between the T die 1 and the suction chamber 4, other structures are also appropriate as long as they can close the gap between the T die 1 and the suction chamber 4 while following the variation of the dimension of the gap, and in addition to a n elastic body such as a rubber, bellows members or the like are also acceptable.

Besides, in the above-described embodiments, although as the circumferentially moving mechanism for moving the suction chamber 4 along the cirumferential directions of the casting roll 3 while maintaining the necessary seal gap 4d there have been described the three modes: the driving member 7; the guide member 8; and the combination of the driving member 9 and the guide member 10, this invention is not limited to these, other mechanisms are also acceptable as long as they can move the suction chamber 4 along the circumferential directions of the casting roll 3 in a state of maintaining the necessary seal gap 4d.

[4] Description of Fourth Embodiment

Figure 4:
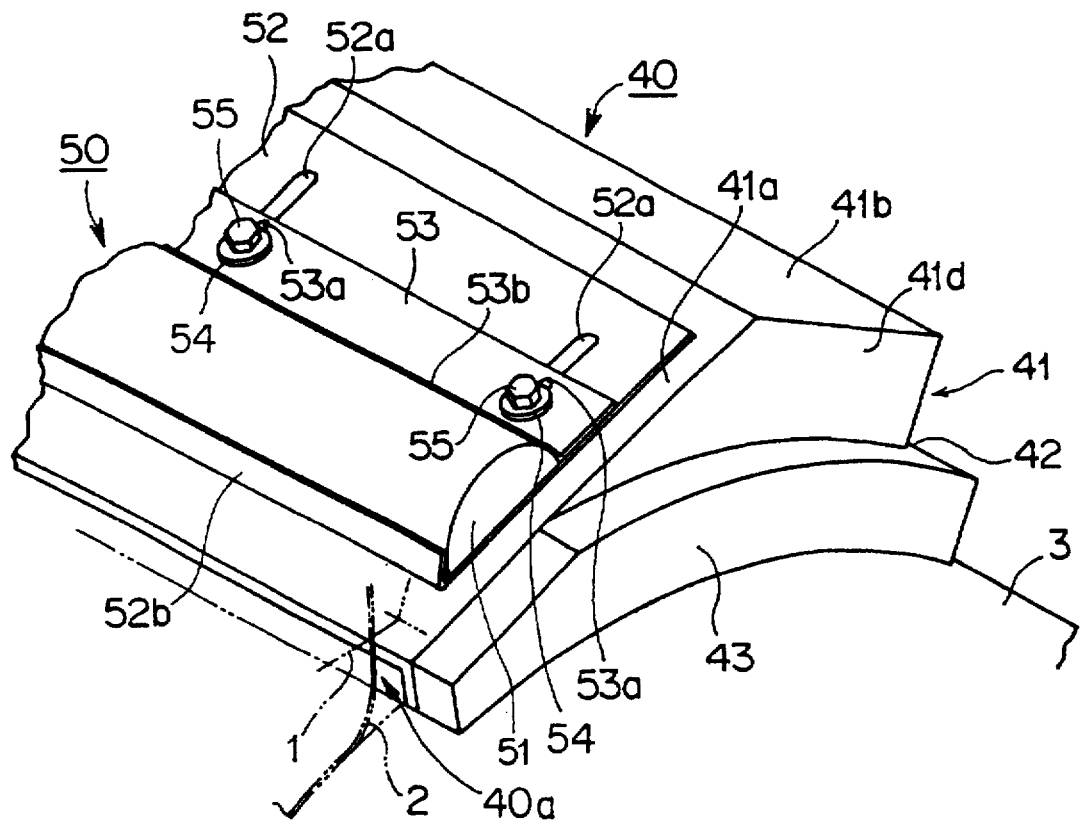
FIG. 4 is a perspective view illustratively showing a construction and fitted condition of an elastic seal member in a casting apparatus for resin-made membrane formation according to a fourth embodiment of this invention.
Figure 5:
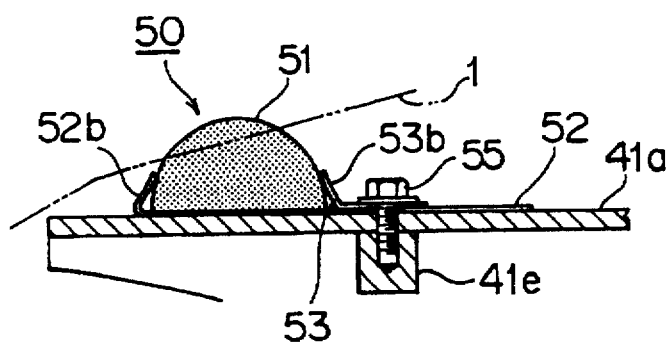
FIG. 5 is a side elevational cross-sectional view showing the construction and fitted condition of the elastic seal member in the fourth embodiment.
Figure 6:
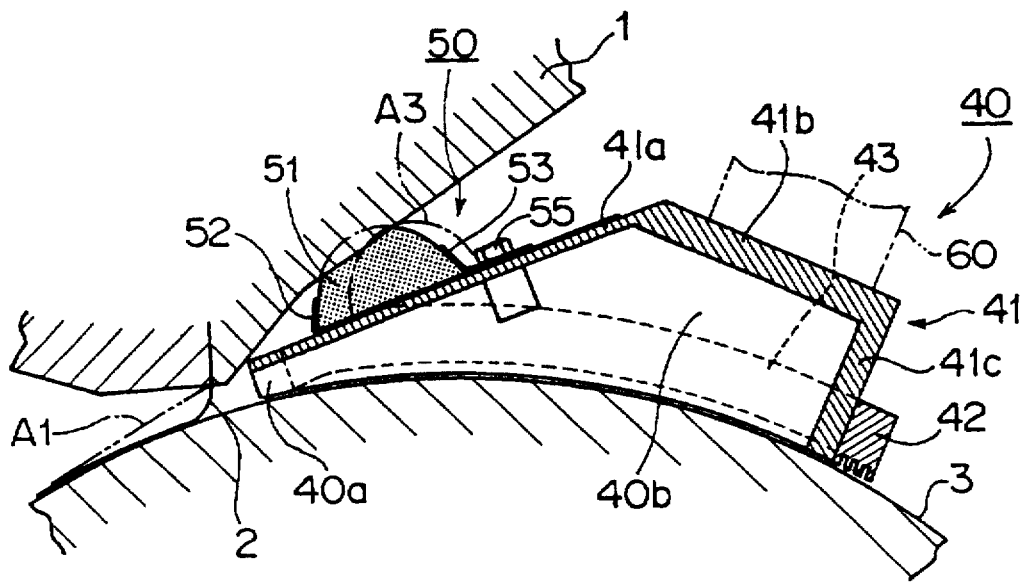
FIG. 6 is a side elevational cross-sectional view showing a mounted condition of the elastic seal member in the fourth embodiment.
Figure 7:
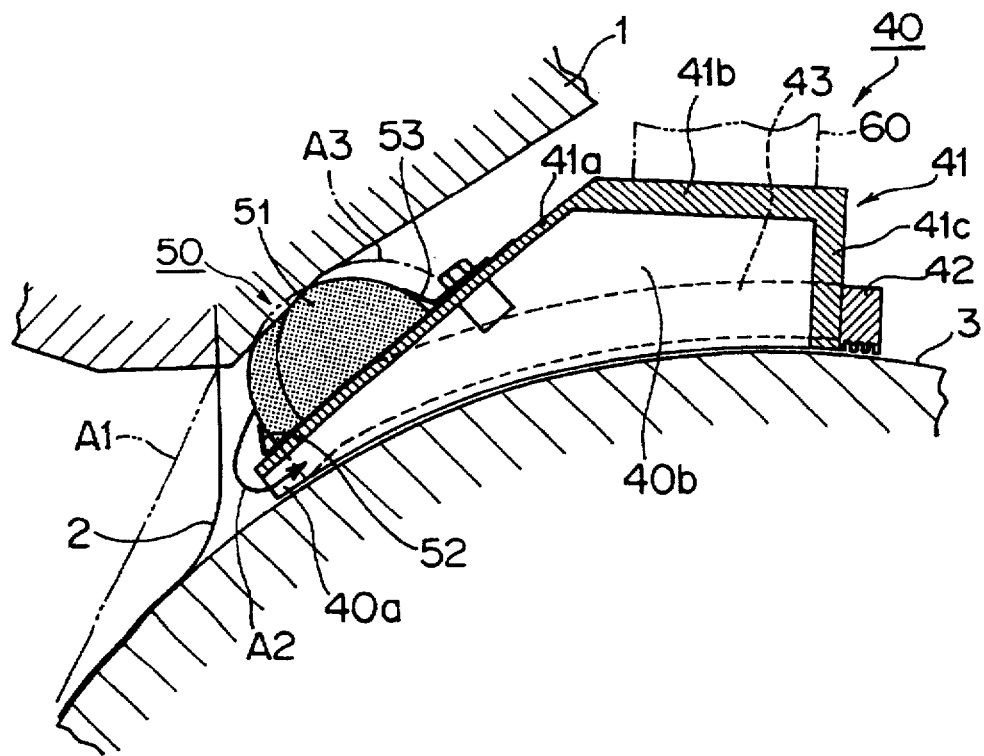
FIG. 7 is a side elevational cross-sectional view showing a mounted condition of an elastic seal member different in size from the FIG. 6 member in the casting apparatus according to the fourth embodiment.

FIGS. 4 to 7 respectively show principal sections of a casting apparatus for resin-made membrane formation according to a fourth embodiment of this invention. Of these drawings, FIGS. 4 and 5 are a perspective view and a side-elevational cross-sectional view each showing a structure and fitted condition of an elastic seal member thereof, FIG. 6 is a side-elevational cross-sectional view showing a mounted condition of the elastic member, and FIG. 7 is a side-elevational cross-sectional view showing a mounted condition of an elastic seal member different in size from the FIG. 6 member.

In this fourth embodiment, a description will be made of a more detailed structure of the elastic seal body 6 interposed between the T die 1 and the suction chamber 4 in the above-described first to third embodiments. In the illustrations, the same numerals as the above-taken numerals represent the same parts, and the description thereof will be omitted. In addition, in the fourth to twelfth embodiments, the suction chamber (vacuum box) represented at numeral 4 in the first to third embodiments will be designated at numeral 40, and the elastic seal body 6 will be described as being an elastic seal member 50.

As shown in FIGS. 4, 5 and 6, a suction chamber 40 of the casting apparatus according to the fourth embodiment fulfills a function similar to that of the suction chamber 4 in the first to third embodiments, and is composed of a housing 41 comprising upper walls 41a, 41b, a rear wall 41c and left- and right-hand side walls 41d, and labyrinth packings 42, 43 fixedly secured to outer-surface lower portions of the left- and right-hand side walls 41d and to the rear wall 41c, respectively. The labyrinth packing 43 is fixed to the left- and right-hand side walls 41d.

Furthermore, a front side (left side in FIGS. 5 and 6) of the suction chamber 40 is open, and a suction inlet (opening section) 40a is made between the upper wall 41a of the suction chamber 40 and an outer circumferential surface of the casting roll 3. In addition, the housing 41 is closed by the outer circumferential surface of the casting roll 3 from the below except the suction inlet 40a, and a suction room 40b is defined between the housing 41 and the casting roll 3.

The labyrinth packings 42, 43 stand against the outer circumferential surface of the casting roll 3 in a state where they are in a slightly spaced relation to each other to possibly suppress the inflow of the air from below the rear wall 41c and the left- and right-hand walls 41d. Incidentally, in place of the labyrinth packings 42, 43, it is also possible to use rubber seals, felt seals or the like.

The suction room 40b is coupled through a suction duct 60, fixedly secured to the upper wall 41b, to a vacuum pump 5 (see FIGS. 1 to 3).

The entire suction chamber 40 is rotatably supported coaxially with the casting roll 3 (around the roll supporting shaft 3a) through any one of the circumferentially moving mechanisms described with reference to FIGS. 1 to 3 to be revolvable along the outer circumferential surface of the casting roll 3 while maintaining the necessary seal gap.

In this embodiment, the elastic seal member 50 is disposed throughout a width exceeding the overall width of the membrane 2, and as shown in FIGS. 4 to 7, is made up of an elastic seal body 51 and fixtures (fitting tools) 52, 53.

The elastic seal body 51 is made of a foaming agent such as a polyimide foam having an excellent heat resistance, a high impact resilience and a less compressive permanent strain, and formed into a semicircular bar-like configuration in cross section, with its front surface being covered with a glass cloth (made by integrally adhering an aluminium foil through an adhesive to a glass cloth) coated with an aluminium foil.

This elastic seal body 51 is fixed to the suction chamber 40 in a manner that its lower portion is held between rising portions 52b, 53b of the fixtures 52, 53 in the forward and backward directions and the fixtures 52, 53 are fixedly tightened with fitting bolts 55 with respect to the upper wall 41a of the suction chamber 40.

Furthermore, as shown in FIGS. 6 and 7, the elastic seal member 50 closes the gap between the T die 1 and the suction chamber 40 in a manner that the elastic seal body 51 is pressed by an elastic force to be brought into contact with the T die 1.

The fixture 53 is disposed to be placed on the fixture 52, and in a state where elongated holes 52a made on the fixture 52 side are aligned with elongated holes 53a made on the fixture 53 side, the fitting bolts 55 are inserted through washers 54 into these elongated holes 52a, 53a and tightened with respect to the upper wall 41a of the suction chamber 40 so that the fixtures 52, 53 are fixed integrally. As shown in FIG. 5, upper wall 41a side female screws to be engaged with the fitting bolts 55 are constructed as blind screws in a rear plate 41e.

As shown in FIG. 7, the elongated holes 52a are made for the purpose of changing the position of the fixture 53 so that elastic seal bodies 51 different in size can be fitted to the suction chamber 40. Further, the elongated holes 53a are for the purpose of adjusting the fitting position of the elastic seal member 50 to the suction chamber 40 in cooperation with the fixture 52 side elongated holes 52a. Thus, in fitting, the elastic seal member 50 can be shifted from the position indicated with a solid line in FIGS. 6 and 7 to the position indicated with a dashed line A3 in FIGS. 6 and 7.

In FIG. 6, in the apparatus according to the fourth embodiment, since, for example, the membrane (film, sheet) 2 has a thin thickness and a relatively weak force suffices for sucking the membrane 2 by the suction chamber 40, the distance between the T die 1 and the casting roll 3 is shown to be short. In FIG. 7, in the apparatus according to the fourth embodiment, since, for example, the membrane (film, sheet) 2 is thick and the force for sucking the membrane 2 by the suction chamber 40 needs to be relatively strong, the distance between the T die 1 and the casting roll 3 is shown to be long.

Further, although the lower surface configuration of the T die 1 of the apparatus shown in FIGS. 1 to 3 has a gradient to spread from a horizontal plane in the vicinity of an opening for the extrusion of the membrane 2 toward the external (right-hand side in the illustrations), in this embodiment shown in FIGS. 6 and 7, the lower surface configuration of the T die 1 has two different gradients. However, the difference between these T die 1 lower surface configurations does not particularly make a sense. Further, it is also appropriate that the elastic seal member 50 is attached to the lower surface of the T die 1 and is pressed with an elastic force to be brought into contact with the upper surface side of the suction chamber 40.

Secondly, a description will be made hereinbelow of an operation of the resin-made membrane formation casting apparatus according to the fourth embodiment thus constructed.

A molten resin is extruded from the T die 1 into the membrane 2 which in turn, is rolled around the casting roll 3 to be formed while cooled. In the case of no use of the suction chamber 40, the membrane 2 in the molten condition is pulled by the casting roll 3 to run in a direction indicated with a two-dot chain line A1 in FIG. 6 or 7, and at this time, air is taken in between the membrane 2 and the casting roll 3, thus deteriorating the quality of the membrane 2.

For this reason, the sucking operation of the suction chamber 40 produces a negative pressure on the rear side of the membrane 2 (the right-hand side in FIGS. 6 and 7), and the pressure difference from the front side pressure pulls the membrane 2 backwardly so that the membrane 2 takes the standing position shown by a solid line in FIGS. 6 and 7 to enlarge the entry angle of the membrane 2 into the casting roll 3.

For producing the negative pressure on the rear side of the membrane 2, a partition is formed on the rear side of the membrane 2 and the air between the partition and the membrane 2 is sucked by the suction chamber 40. If this space partitioned does not has an appropriate dimension, a n unstable phenomenon that the membrane 2 vibrates by the air sucked takes place. Particularly, as indicated with an arrow A2 in FIG. 6, when the passes through between the T die 1 and the suction chamber 40 to flow into the interior of the suction room 40b, the unstableness tends to occur.

For this reason, the tip portion of the suction chamber 40 is adjusted to take an optimal position where the unstable phenomenon is hard to occur, and for that adjustment, there is a need to close the gap between the T die 1 and the suction chamber 40 to prevent the formation of the air inflow passage from the external even if changing the position of the suction chamber 40.

In this embodiment, even if the interval between the upper surface of the suction chamber 40 and the lower surface of the T die 1 varies, the elastic seal member 50 elastically deforms to automatically continue to close the gap therebetween. In FIGS. 6 and 7, the contour configuration of the elastic seal member 50 before the movement of the suction chamber 40 (the contour configuration before being pressed by the T die 1 to deform) is shown with a two-dot chain line.

Incidentally, in the case of largely changing the positional relationship between the T die 1 and the casting roll 3, the elastic seal member 50 itself is replaced with an elastic seal member with a different size for adjustment.

Thus, in the resin-made membrane formation casting apparatus according to the fourth embodiment of this invention, since the elastic seal member 50 can certainly and automatically close the gap between the upper surface of the suction chamber 40 and the lower surface of the T die 1 even if the position of the suction chamber 40 varies, the airtightness of the pressure reduction space surrounded by the T die 1, the membrane 2 and the suction chamber 40 is securable, with the result that the necessary pressure reduction level is surely obtainable in that pressure reduction space.

In addition, also at the positional adjustment of the suction chamber 40 for the optimal condition which is to be conducted prior to the start of the production operation for each membrane (film, sheet) 2, as mentioned above, the elastic seal member 50 can certainly and automatically close the gap between the upper surface of the suction chamber 40 and the lower surface of the T die 1 even if the position of the suction chamber 40 varies, and therefore, it is possible to surely prevent the vibrations of the membrane 2 taking place due to the fact that the air flows from that gap into the suction chamber 40, and the adjustment work becomes extremely facilitated, and even the production operation can be started immediately after the adjustment work.

[5] Description of Fifth Embodiment

Figure 8A:
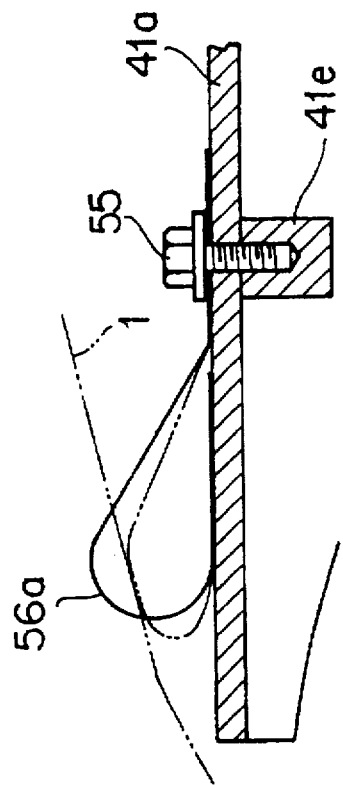
FIGS. 8A to 8C are side elevational cross-sectional views each showing a structure and fitted condition of an elastic seal member in a casting apparatus for resin-made membrane formation according to a fifth embodiment of this invention.
Figure 8B:
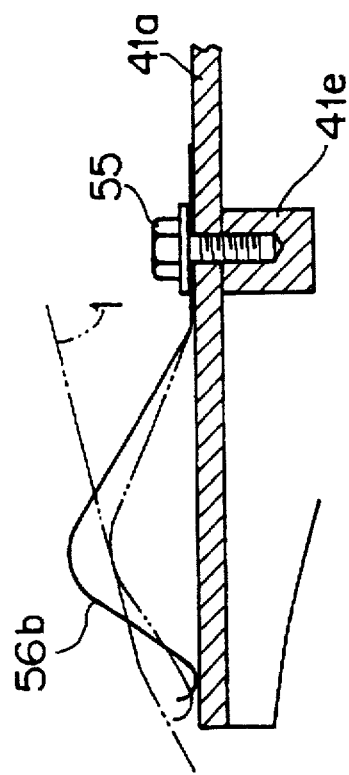
Figure 8C:
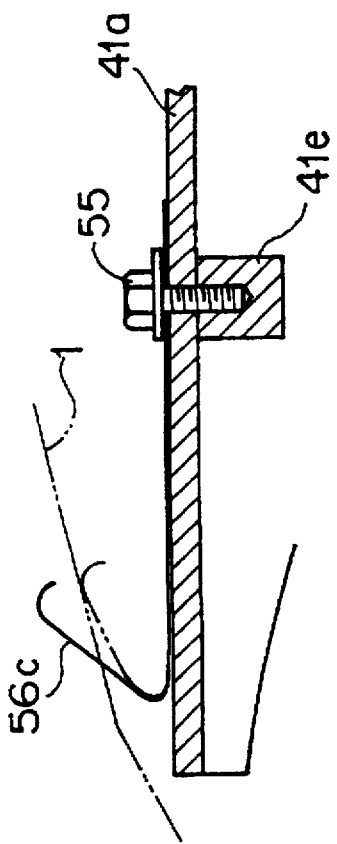

FIGS. 8A to 8C are side-elevational cross-sectional views each showing a structure and fitted condition of an elastic seal member in a casting apparatus for resin-made membrane formation according to a fifth embodiment of this invention.

In this fifth embodiment, as the elastic seal member for closing the gap between the T die 1 and the suction chamber 40, instead of the elastic seal member 50 in the casting apparatus according to the fourth embodiment described before with reference to FIGS. 4 to 7, there is used any one of plate springs 56a to 56c shown in FIGS. 8A to 8C. The other components are the same as those in the fourth embodiment.

Each of these plate springs 56a to 56c is made from a thin metal (plate thickness is below 1 mm) with a corrosion resistance such as a stainless steel, and is disposed throughout a width exceeding the overall width of the membrane 2 and is attached through a fitting bolt 55 to the upper wall 41a of the suction chamber 40. Further, each of the metallic plate springs 56a to 56c is pressed with an elastic force to come into contact with the lower surface of the T die 1, thereby closing the gap between the lower surface of the T die 1 and the upper surface of the suction chamber 40.

The plate spring 56a shown in FIG. 8A has a configuration in which its tip portion is inflated into an arc shape to be returned, and the plate spring 56b shown in FIG. 8B has an angle configuration having an arc portion at an upper section, and the plate spring 56c shown in FIG. 8C has a hook-like configuration in which it tip side is directed upwardly. In every illustration, the condition deformed by the contact with the T die 1 is indicated with a two-dot chain line.

These plate springs 56a to 56c are made to close the gap by being brought with an elastic force into contact with both the lower surface of the T die 1 and the upper surface of the suction chamber 40, and hence, the configuration is not limited to those shown in FIGS. 8A to 8C. Further, it is also appropriate that each of the plate springs 56a to 56c is fitted to the lower surface of the T die 1 whereas being pressed with an elastic force to come into contact with the upper surface side of the suction chamber 40.

Furthermore, in the case of largely changing the positional relationship between the T die 1 and the casting roll 3, each of the plate springs 56a to 56c themselves is replaced with a plate spring with a different size for adjustment.

Thus, the resin-made membrane formation casting apparatus according to the fifth embodiment of this invention can also offer the same effects as those of the fourth embodiment by using the plate springs 56a to 56c shown in FIGS. 8A to 8C.

[6] Description of Sixth Embodiment

Figure 9:
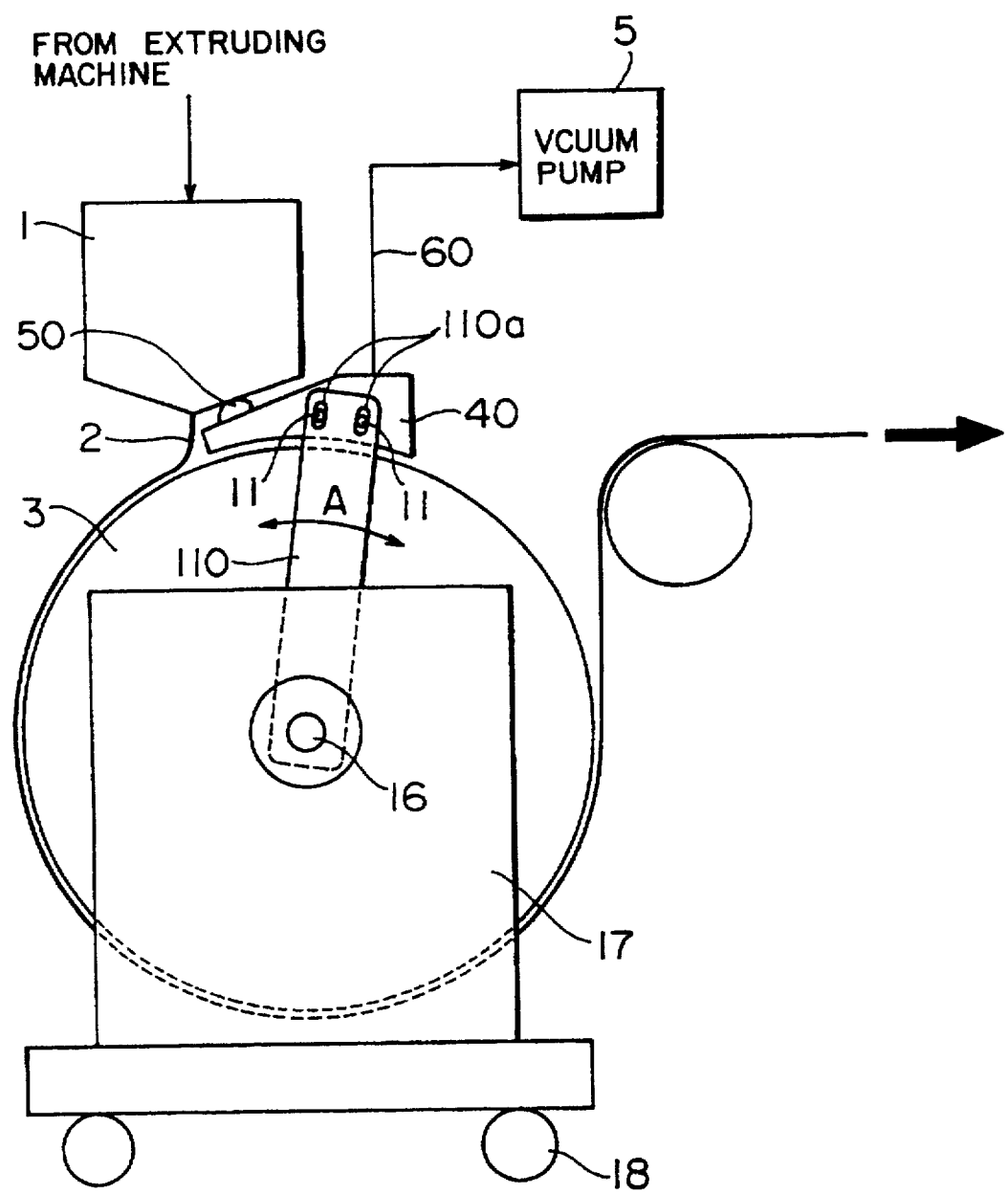
FIG. 9 is a side elevational view illustratively showing a casting apparatus for resin-made membrane formation according to a sixth embodiment of this invention.
Figure 10:
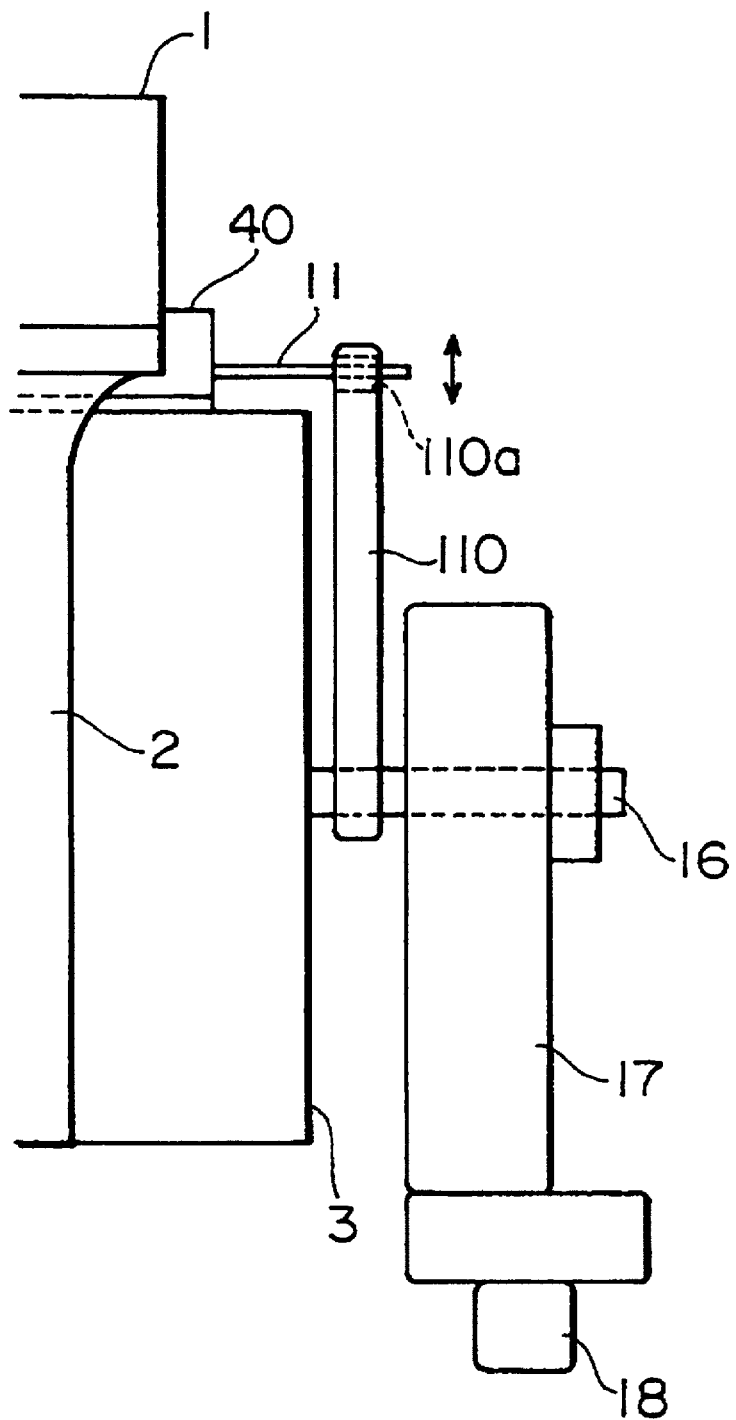
FIG. 10 is a front elevational view illustratively showing the casting apparatus for resin-made membrane formation according to the sixth embodiment of this invention.
Figure 11:
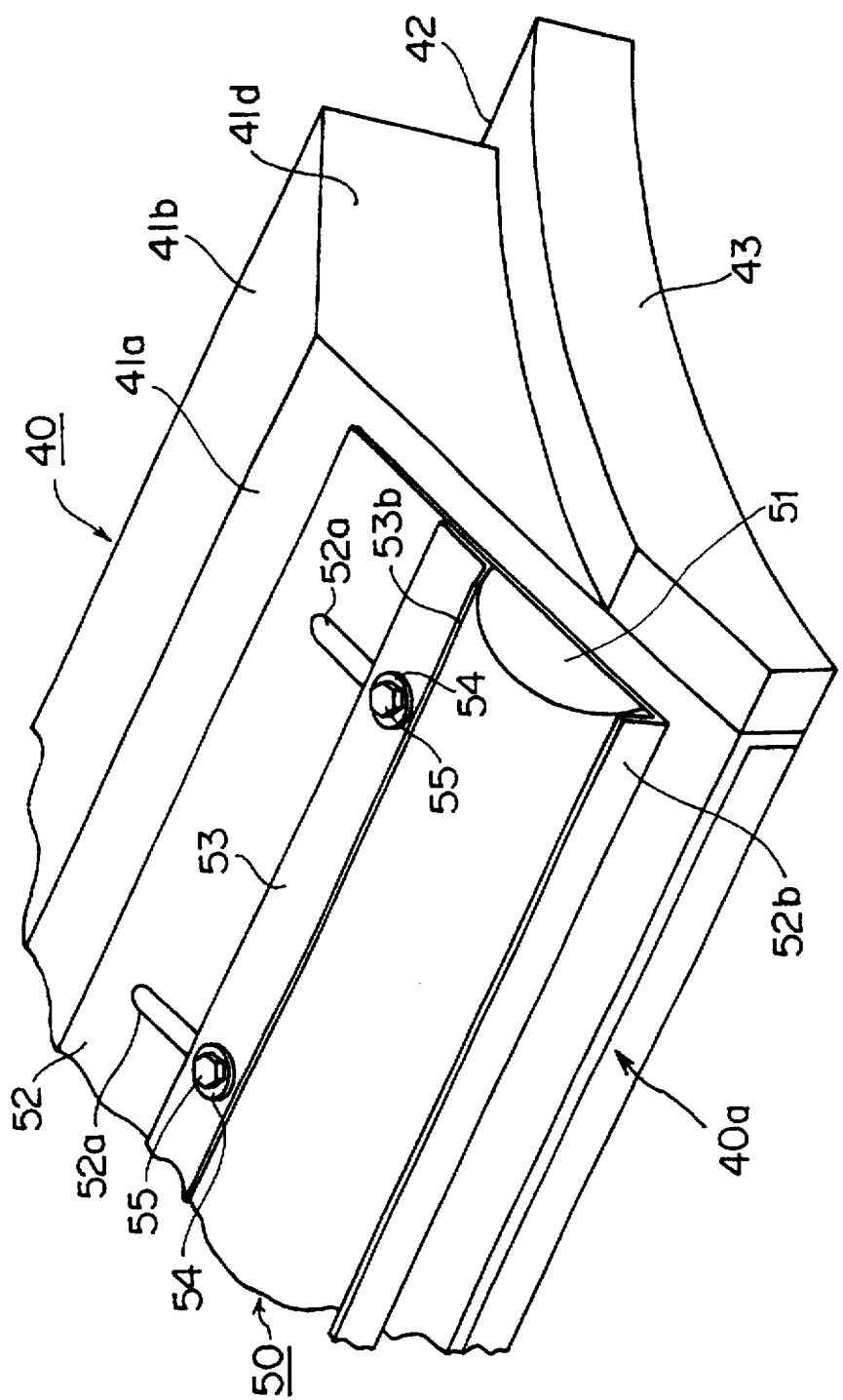
FIG. 11 is a perspective view showing a structure and fitted condition of an elastic seal member in the sixth embodiment.
Figure 12:
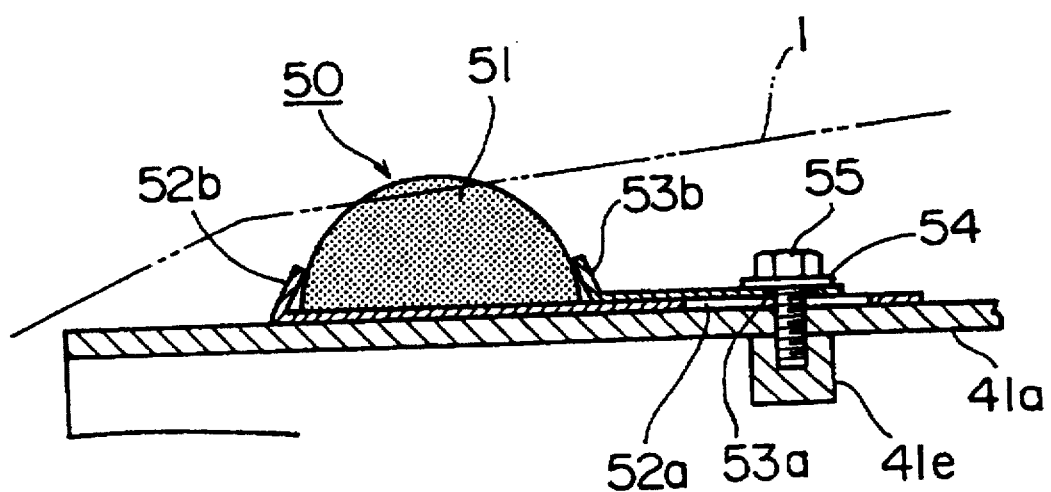
FIG. 12 is a side elevational cross-sectional view showing the structure and fitted condition of the elastic seal member in the sixth embodiment.
Figure 13:
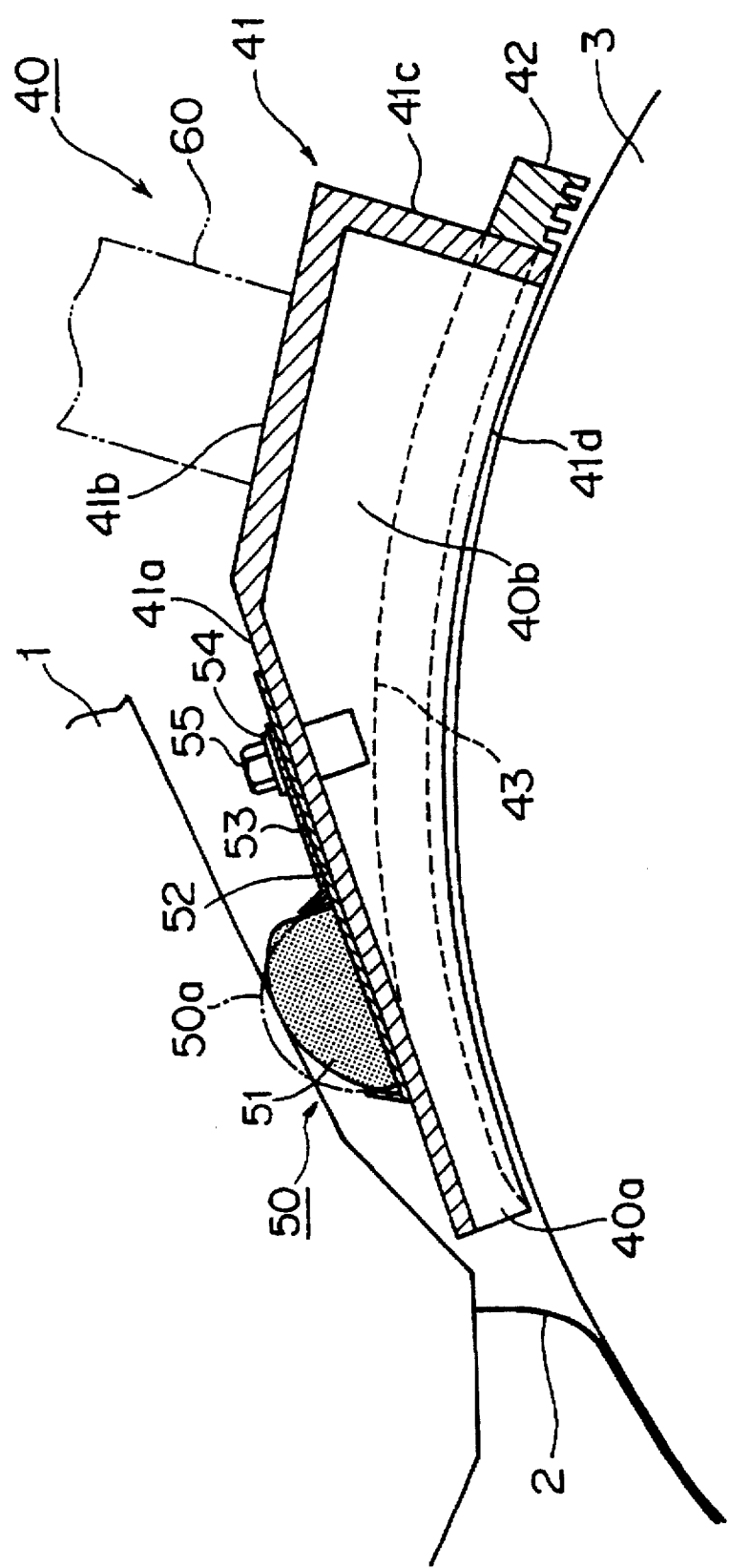
FIG. 13 is a side elevational cross-sectional view showing a mounted condition of the elastic seal member in the sixth embodiment.
Figure 14:
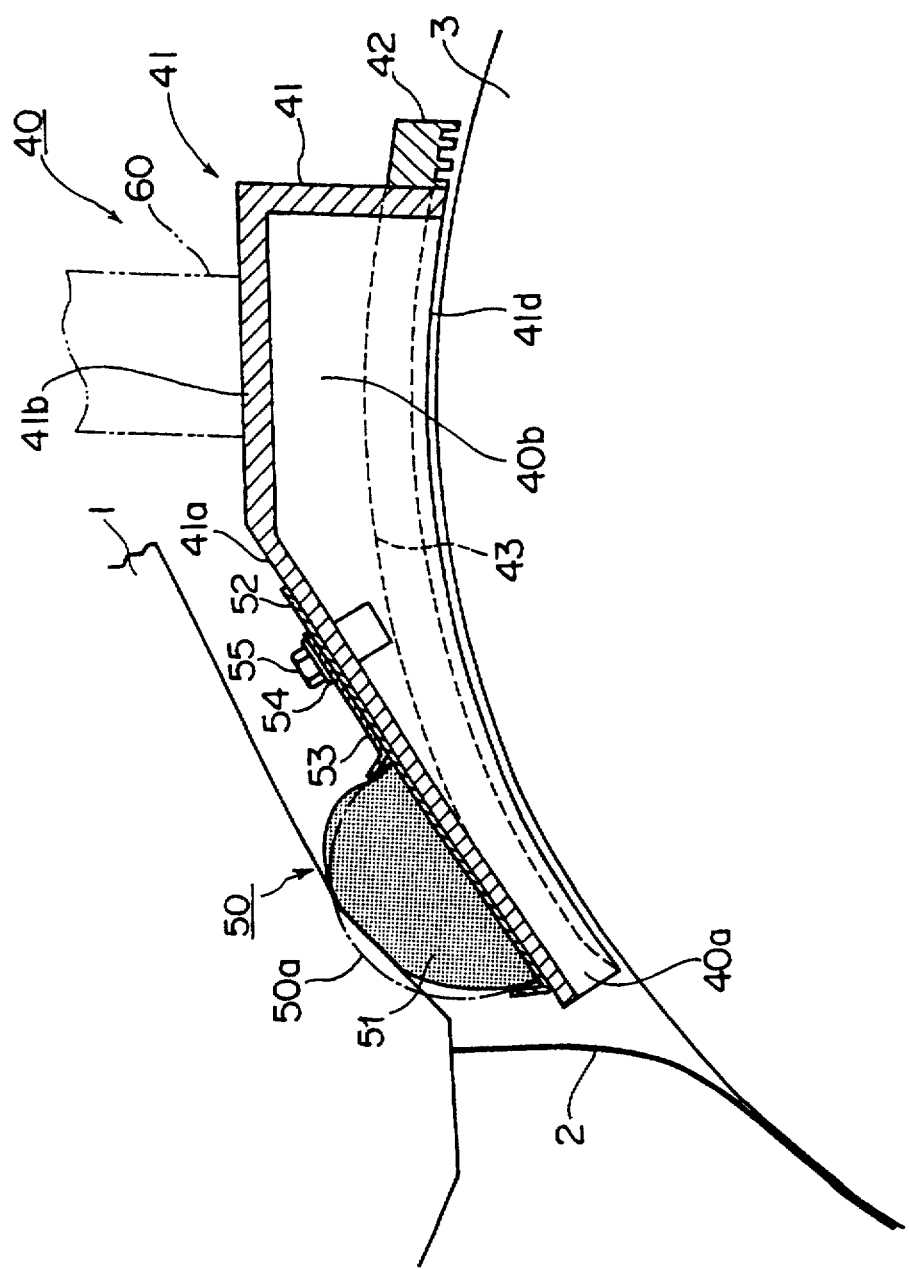
FIG. 14 is a side elevational cross-sectional view showing a mounted condition of an elastic seal member different in size from the FIG. 13 member in the casting apparatus according to the sixth embodiment.
Figure 15:
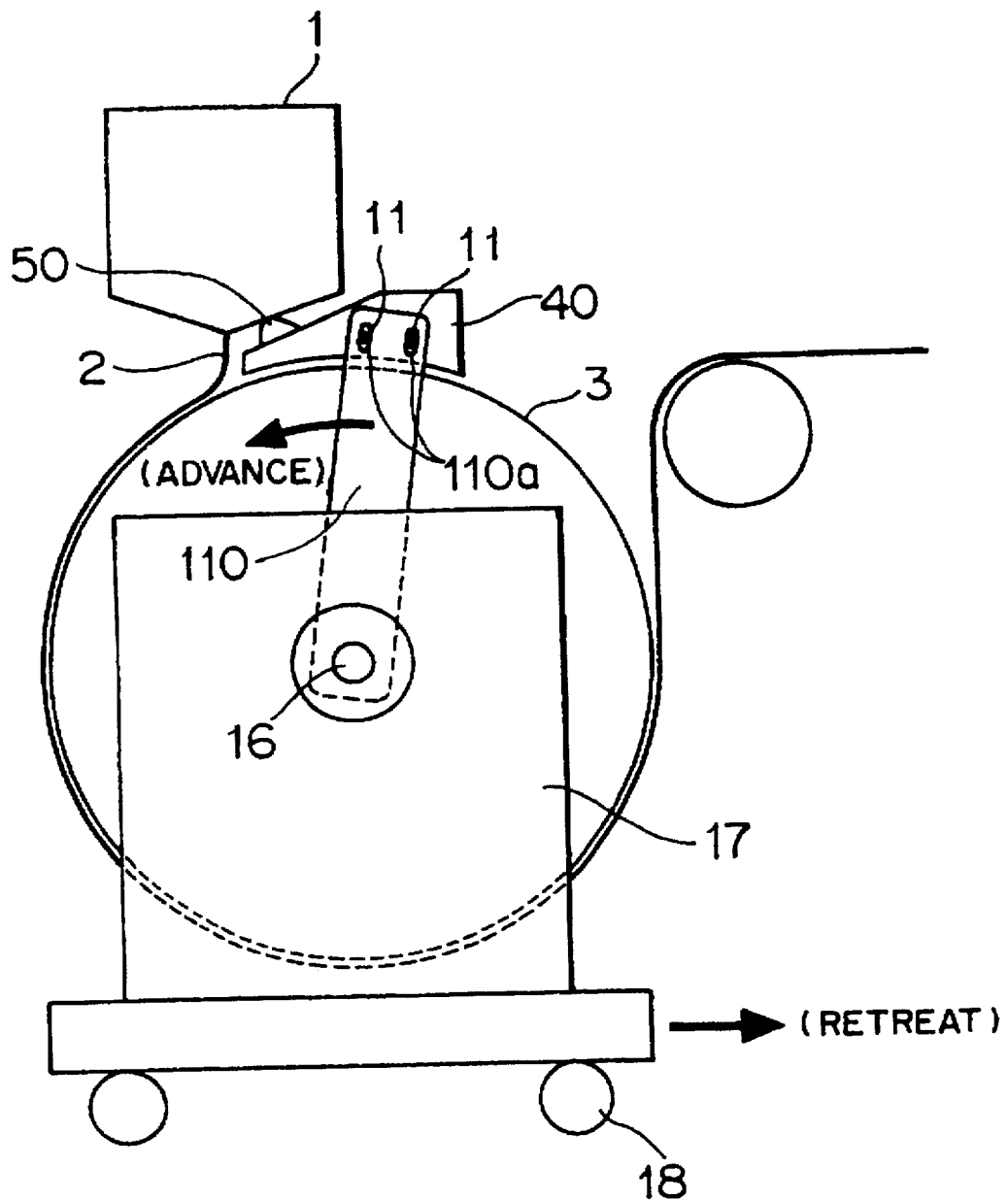
FIG. 15 is an illustrative side-elevational view useful for explanation of an example of operations of the sixth embodiment.
Figure 16:
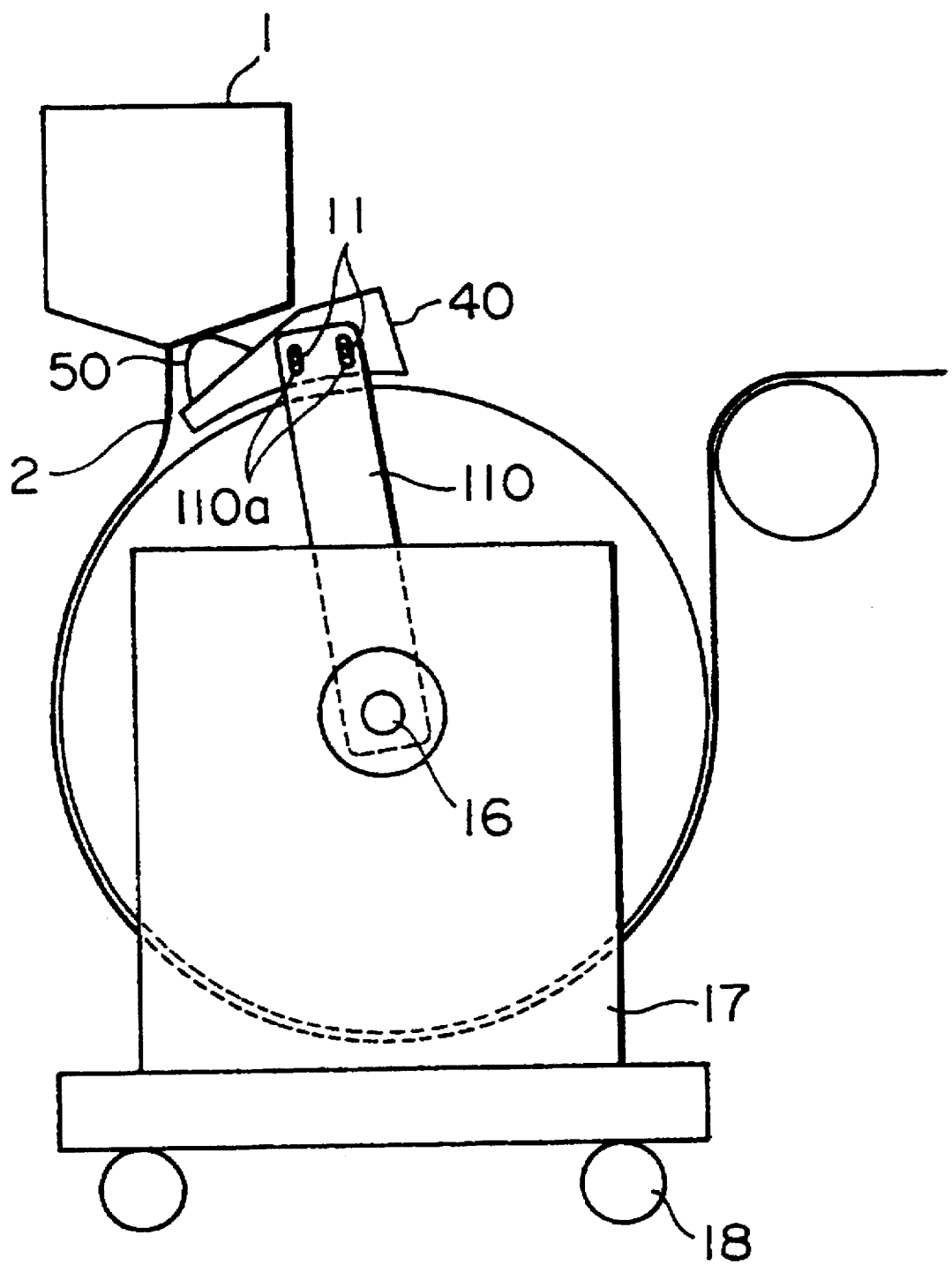
FIG. 16 is an illustrative side-elevational view useful for explanation of an example of operations of the sixth embodiment.

FIGS. 9 to 16 are illustrations of a casting apparatus for resin-made membrane formation according to a sixth embodiment of this invention. Of these illustrations, FIGS. 9 and 10 are respectively an illustrative side elevational view and an illustrative front elevational view, FIGS. 11 and 12 are a perspective view and a side elevational cross-sectional view respectively showing a structure and fitted condition of an elastic seal member thereof, FIG. 13 is a side-elevational cross-sectional view showing a mounted condition of the elastic seal member, FIG. 14 is a side-elevational cross-sectional view showing a mounted condition of the elastic seal member different in size from FIG. 13 member, and FIGS. 15 and 16 are illustrative side elevational views each for describing an example of operations thereof. In the illustrations, the same numerals as those in the above description denote the same or corresponding portions, and hence, the explanation thereof will sometimes be omitted.

As shown in FIGS. 1 and 2, the casting apparatus according to the sixth embodiment is also composed of a T die (die) 1 for extruding a resin molten by an extruding machine (not shown) into a film-like or sheet-like membrane 2, a casting roll (cooling roll) 3 for receiving the membrane 2 extruded from the T die 1 on its outer circumferential surface to cool and deliver it, and a suction chamber 40 for sucking air between the membrane 2 and the casting roll 3 to make the membrane 2 stably come closely into contact with the surface of the casting roll 3. Further, the casting roll 13 is supported on a roll supporting shaft 16 to be rotatable with respect to a side frame 17, wheels 18 to be used when moving this apparatus in a horizontal direction are fitted to lower portions of the side frame 17.

Also in this embodiment, the suction chamber 40 is provided independently of the T die 1. Further, the suction chamber 40 is formed along the outer circumferential surface of the casting roll 3, and a necessary seal gap is defined between the suction chamber 40 and the outer circumferential surface of the casting roll 3. The dimension (interval) of this gap is set to ensure a necessary suction force (pressure reduction level) in a close contact section between the membrane 2 and the casting roll 3 concurrently with allowing the rotation of the casting roll 3.

As shown in FIGS. 11, 13 and 14, the suction chamber 40 is constructed as being similar to the suction chamber 40 in the fourth embodiment described before with reference to FIGS. 4 to 7.

A vacuum pump 5 is coupled through a suction duct 60 to the suction chamber 40, and on the operation of the vacuum pump 5, the air between the membrane 2 and the casting roll 3 is sucked through a suction inlet (opening section) 40a of the suction chamber 40. Further, the suction inlet 40a is formed throughout the overall width of the membrane 2 in the proximity of a portion at which the membrane 2 starts to come closely into contact with the outer circumferential surface of the casting roll 3.

Moreover, in the sixth embodiment, as in the case of the first embodiment, a driving member 110 is used as a circumferentially moving mechanism for moving the suction chamber 40 along the circumferential directions of the casting roll 3 while holding the necessary seal gap. This driving member 110 is constructed such that its proximal side is supported coaxially with a roll supporting shaft (rotary shaft) 16 of the casting roll 3 to be rotatable around the roll shaft 16 (directions of arrows A in FIG. 9) while its tip side is fixed to the suction chamber 40.

In addition, the driving member 110 has two elongated holes 110a made along the radial directions of the casting roll 3, and by adjusting the tightening positions of supporting bolts 11 penetrating these elongated holes 110a, the suction chamber 40 is fitted with respect to the driving member 110 to be movable in the radial directions of the casting roll 3, that is, so that a necessary seal gap between the outer circumferential surface of the casting roll 3 and the suction chamber 40 is adjustable. A radially moving mechanism is constructed with the aforesaid elongated holes 110a and supporting bolts 11. In FIG. 10, only one end portion side of the apparatus according to this embodiment in the width direction is shown, but the other end portion side is constructed in a similar way.

Furthermore, an elastic seal member 50 is interposed between the T die 1 and the suction chamber 40 and the interval between the T die 1 and the suction chamber 40 is sealed with the elastic seal member 50.

This elastic seal member 50 is disposed throughout a width exceeding the overall width of the membrane 2 as well as the elastic seal member 50 in the fourth embodiment described with reference to FIGS. 4 to 7, and is composed of an elastic seal body 51 and fixtures (fitting tools) 52, 53 as shown in FIGS. 11 to 14.

The elastic seal body 51 is made of a foaming agent such as a polyimide foam having an excellent heat resistance, a high impact resilience and a less compressive permanent strain, and formed into a semicircular bar-like configuration in cross section, with its front surface being covered with a glass cloth (made by integrally adhering an aluminium foil through an adhesive to a glass cloth) coated with an aluminium foil.

This elastic seal body 51 is fixed to the suction chamber 40 in a manner that its lower portion is held between rising portions 52b, 53b of the fixtures 52, 53 in the forward and backward directions and the fixtures 52, 53 are fixedly tightened with fitting bolts 55 with respect to the upper wall 41a of the suction chamber 40.

Furthermore, as shown in FIGS. 6 and 7, the elastic seal member 50 closes the gap between the T die 1 and the suction chamber 40 in a manner that the elastic seal body 51 is pressed by an elastic force to be brought into contact with the T die 1.

The fixture 53 is disposed to be placed on the fixture 52, and in a state where elongated holes 52a made on the fixture 52 side are aligned with elongated holes 53a made on the fixture 53 side, the fitting bolts 55 are inserted through washers 54 into these elongated holes 52a, 53a and tightened with respect to the upper wall 41a of the suction chamber 40 so that the fixtures 52, 53 are fixed integrally. As shown in FIG. 12, upper wall 41a side female screws to be engaged with the fitting bolts 55 are constructed as blind screws in a rear plate 41e.

As shown in FIG. 14, the elongated holes 52a are made for the purpose of changing the position of the fixture 53 so that elastic seal bodies 51 different in size can be fitted to the suction chamber 40.

In FIGS. 9, 13 and 15, in the apparatus according to the sixth embodiment, since, for example, the membrane 2 has a thin thickness and a relatively weak force suffices for sucking the membrane 2 by the suction chamber 40, the distance between the T die 1 and the casting roll 3 is shown to be short. In FIGS. 14 and 16, in the apparatus according to the sixth embodiment, since, for example, the membrane 2 is thick and the force for sucking the membrane 2 by the suction chamber 40 needs to be relatively strong, the distance between the T die 1 and the casting roll 3 is shown to be long.

Secondly, a description will be made hereinbelow of an operation of the resin-made membrane formation casting apparatus according to the sixth embodiment thus constructed.

Basically, the apparatus according to the sixth embodiment takes an operation similar to that in the first embodiment shown in FIG. 1. In this embodiment, as shown in FIGS. 15 and 16, the interval between the T die 1 and the casting roll 3 is enlarged by retreating the casting roll 3. However, if only retreating the casting roll 3, the side surface opening section made by the membrane 2, the outer circumferential surface of the casting roll 3 and the tip portion of the suction chamber 40 enlarges, so that difficulty is experienced to reach the necessary pressure reduction level.

For this reason, as shown in FIG. 15, the suction chamber 40 fitted to the driving member 110 is advanced to a given position to make the side surface opening section small and the air within the suction chamber 40 is sucked by the vacuum pump 5 up to a necessary pressure reduction level, so that the membrane 2 in a molten condition immediately after the extrusion from the T die 1 can stably be brought closely into contact with the casting roll 3.

Moreover, as mentioned above, even if the gap (interval) between the T die 1 and the suction chamber 40 varies by changing the dimension of the interval between the T die 1 and the casting roll 3 or the position of the suction chamber 40, in this embodiment, the elastic seal member 50 is interposed between the T die 1 and the suction chamber 40, and therefore, the elastic seal member 50 can close the gap, between the T die 1 and the suction chamber 40 while following that variation.

In this embodiment, even if the interval between the upper surface of the suction chamber 40 and the lower surface of the T die 1 varies, the elastic seal member 50 elastically deforms to automatically continue to close the gap therebetween. Whereupon, the airtightness of the pressure reduction space surrounded by the T die 1, the membrane 2 and the suction chamber 40 is securable, thus surely obtaining the necessary pressure reduction level in that pressure reduction space. In FIGS. 13 and 14, the contour configuration of the elastic seal member 50 before the movement of the suction chamber 40 (the contour configuration before being pressed by the T die 1 to deform) is shown with a dashed line 50a.

Incidentally, in the case of largely changing the positional relationship between the T die 1 and the casting roll 3, as shown in FIG. 14 or 16, the elastic seal member 50 itself is replaced with an elastic seal member with a different size for adjustment.

It is also appropriate that the elastic seal member 50 is attached to the lower surface of the T die 1 and is pressed with an elastic force to come into contact with the upper surface side of the suction chamber 40.

Thus, in the resin-made membrane formation casting apparatus according to the sixth embodiment of this invention, since the suction chamber 40 is movable in the circumferential directions of the casting roll 3 while keeping a necessary seal gap with respect to the casting roll 3, and further is movable in the radial directions of the casting roll 3, and hence, the seal gap between the suction chamber 40 and the casting roll 3 is adjustable, besides the elastic seal member 50 can seal the gap between the lower surface of the T die 1 and the upper surface of the suction chamber 40 irrespective of the dimension of the gap.

Accordingly, since the pressure reduction in the space between the membrane 2 and the casting roll 3 is stably achievable by the suction chamber 40 regardless of the dimension of the interval between the T die 1 and the casting roll 3, the interval between the T die 1 and the casting roll 3 can appropriately set for any kind of resin, with the result that the necessary film characteristic (membrane characteristic) is securable to sharply enhancing the quality of the resin-made membrane (film or sheet) 2.

[7] Description of Seventh Embodiment

Figure 17A:
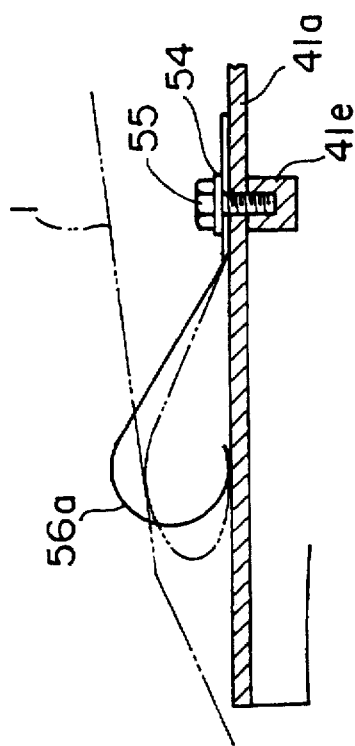
FIGS. 17A to 17C are side elevational cross-sectional views each showing a structure and fitted condition of an elastic seal member in a casting apparatus for resin-made membrane formation according to a seventh embodiment of this invention.
Figure 17B:
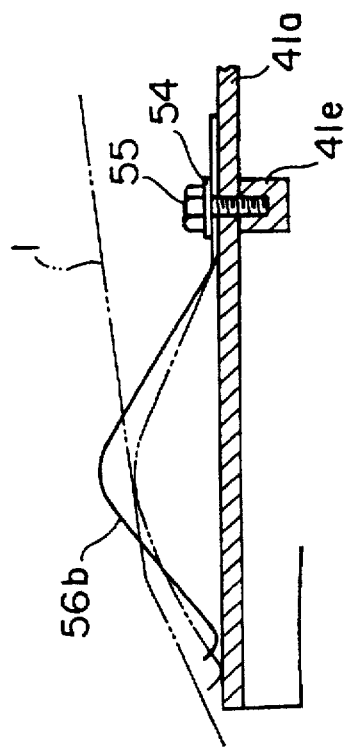
Figure 17C:
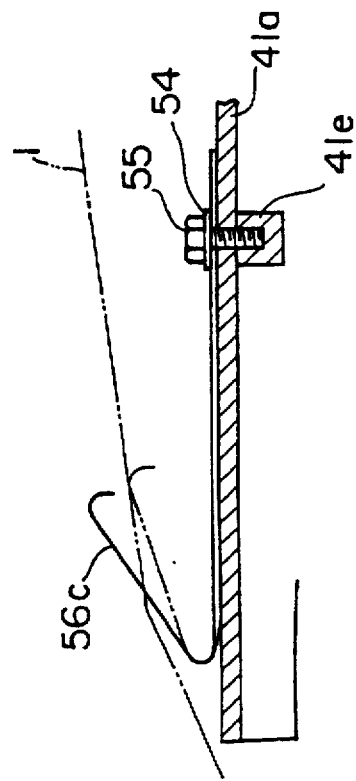

FIGS. 17A to 17C are side-elevational cross-sectional views each showing a structure and fitted condition of an elastic seal member in a resin-made membrane formation casting apparatus according to a seventh embodiment of this invention.

In this seventh embodiment, instead of the elastic seal member 50 in the above-described sixth embodiment, used are any one of plate springs 56a to 56c similar to those described before in the fifth embodiment as shown in FIGS. 17A to 17C. The other portions are the same as those in the sixth embodiment.

Each of these plate springs 56a to 56c is made from a thin metal (its plate thickness is at 1 mm or below 1 mm) with a corrosion resistance such as a stainless steel as in the case of the fifth embodiment, and is disposed throughout a width exceeding the overall width of the membrane 2 and is attached through a fitting bolt 55 to the upper wall 41a of the suction chamber 40. Further, each of the metallic plate springs 56a to 56c is pressed with an elastic force to come into contact with the lower surface of the T die 1, thereby closing the gap between the lower surface of the T die 1 and the upper surface of the suction chamber 40.

The plate spring 56a shown in FIG. 17A has a configuration in which its tip portion is inflated into an arc shape to be returned, and the plate spring 56b shown in FIG. 17B has an angle configuration having an arc portion at a n upper section, and the plate spring 56c shown in FIG. 17C has a hook-like configuration in which its tip side is directed upwardly. In every illustration, the condition deformed by the contact with the T die 1 is indicated with a two-dot chain line.

These plate springs 56a to 56c are made to close the gap by being brought with an elastic force into contact with both the lower surface of the T die 1 and the upper surface of the suction chamber 40, and hence, the configuration is not limited to those shown in FIGS. 17A to 17C. Further, it is also appropriate that each of the plate springs 56a to 56c is fitted to the lower surface of the T die 1 whereas being pressed with an elastic force to come into contact with the upper surface side of the suction chamber 40.

Furthermore, in the case of largely changing the positional relationship between the T die 1 and the casting roll 3, each of the plate springs 56a to 56c themselves is replaced with a plate spring with a different size for adjustment.

Thus, the resin-made membrane formation casting apparatus according to the seventh embodiment of this invention can also offer the same effects as those of the sixth embodiment by using the plate springs 56a to 56c shown in FIGS. 17A to 17C.

[8] Description of Eighth Embodiment

Figure 18:
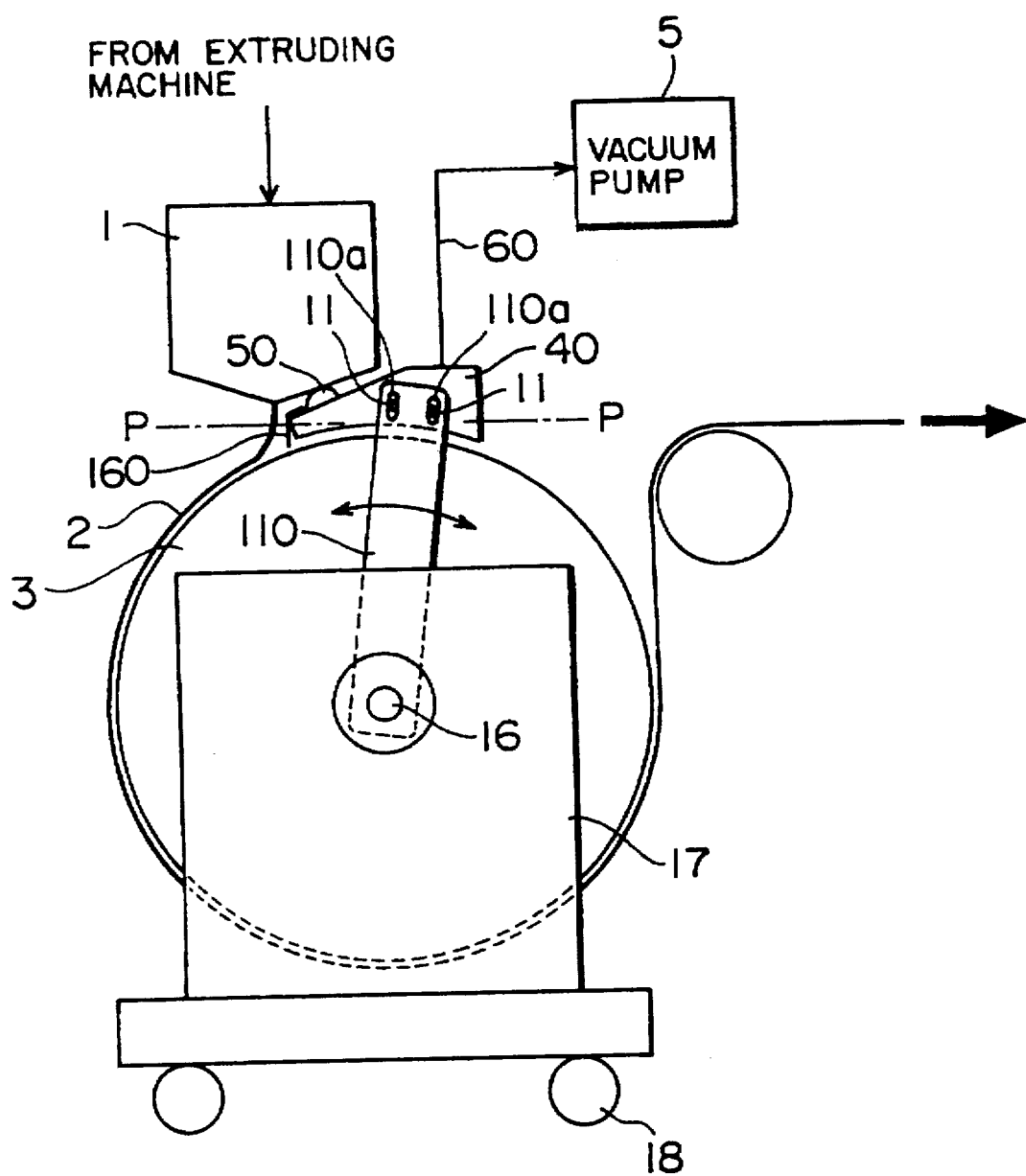
FIG. 18 is a side elevational view illustratively showing a casting apparatus for resin-made membrane formation according to an eighth embodiment of this invention.
Figure 19:
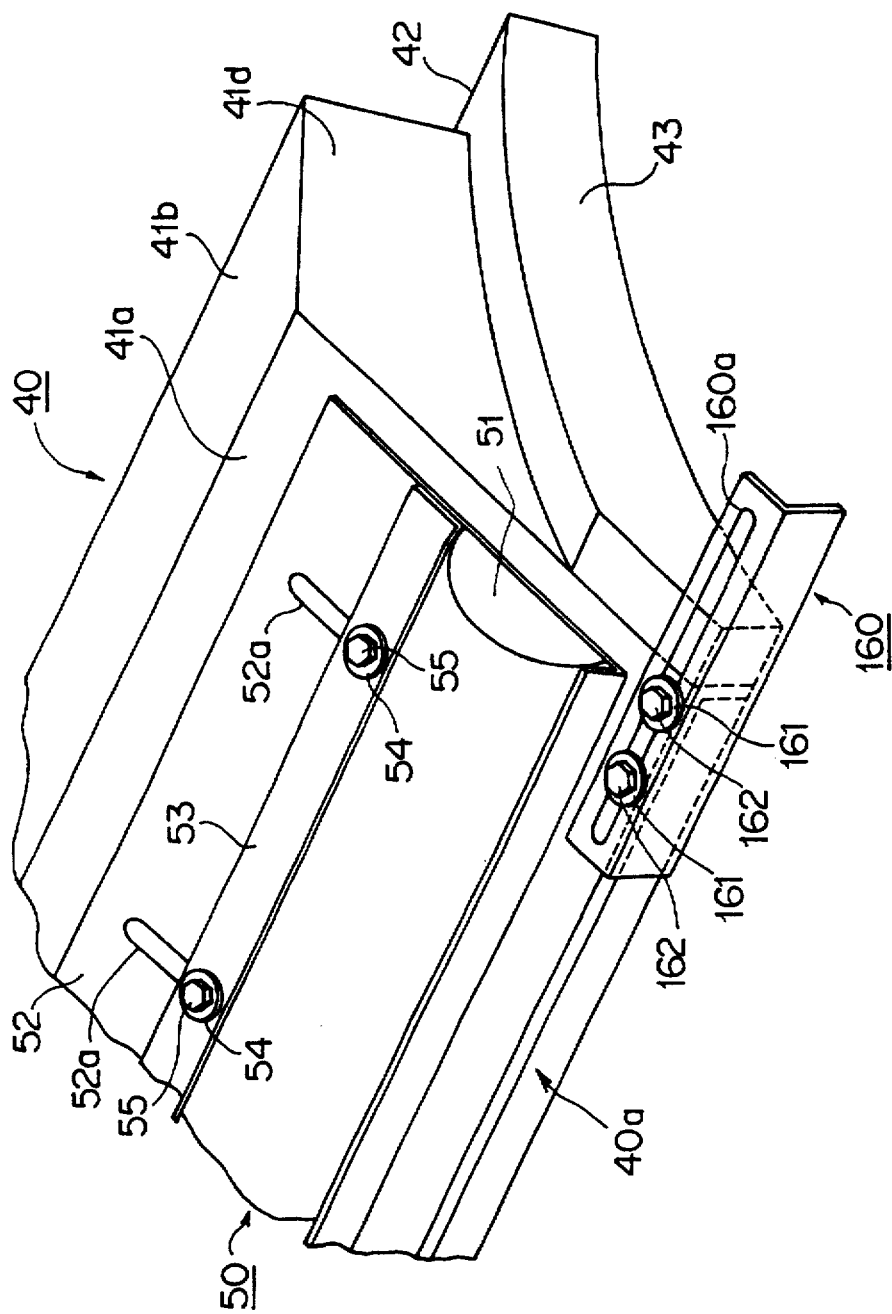
FIG. 19 is a perspective view showing structure and fitted conditions of an elastic seal member and a shielding plate in the eighth embodiment.
Figure 20:
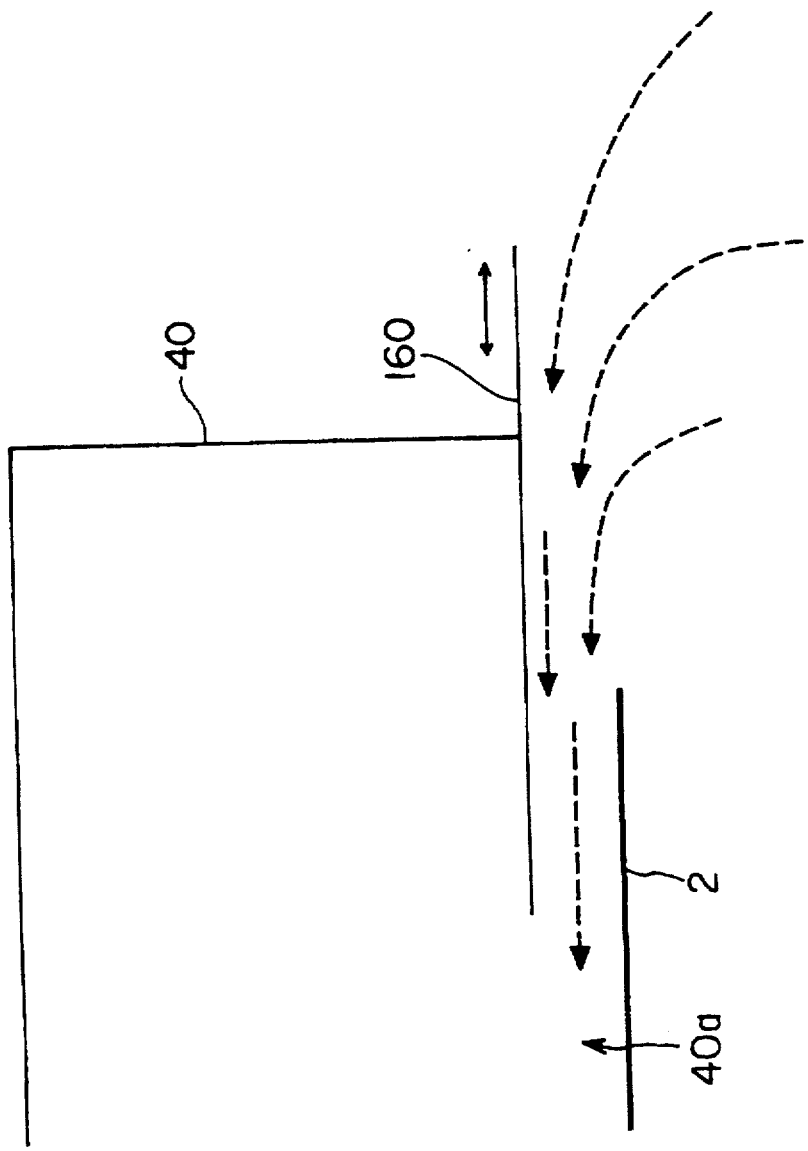
FIG. 20 is an illustration of an outside air inflow situation in a cross section along a line P—P of FIG. 18.

FIGS. 18 to 20 are illustrations of a casting apparatus for resin-made membrane formation according to an eighth embodiment of this invention. FIG. 18 is a side elevational view illustratively showing the apparatus, FIG. 19 is a perspective view showing structures and fitted conditions of an elastic seal member and a shielding plate in the apparatus, and FIG. 20 is an illustration of an outside air inflow situation in a cross section taken along a line P—P of FIG. 18. In the illustrations, the same numerals as those in the above explanation designate the same or corresponding parts, and the description thereof will be omitted.

Although having the substantially same construction as that of the above-described sixth embodiment as shown in FIG. 18, in this eighth embodiment, as shown in FIGS. 18 and 19, to an end portion of a suction inlet (suction opening section) 40a of a suction chamber 40, there is fitted a shielding plate 160 for suppressing the suction occurring through the end portion by shielding the end portion opening, with the shielding plate 160 being movable in the width directions of a membrane 2.

More specifically, as shown in FIG. 19, the Shielding plate 160 has an elongated hole 160a made therein, and is fitted to the suction chamber 40 by means of fitting bolts 162 which are placed to penetrate the elongated hole 160a and are tightened through washers 161 with respect to an upper wall 41a of the suction chamber 40. The shielding plate 160 is movable in the width directions of the membrane 2 owing to the elongated hole 160 so that the shielding amount of the end portion of the suction inlet 40 a of the suction chamber 40 is adjustable. Incidentally, although FIG. 19 shows only one end portion side of the apparatus according to this embodiment in the width directions, the other end portion side is constructed in a similar way.

Since the operation of the resin-made membrane formation casting apparatus according to the eighth embodiment of this invention thus arranged are basically the same as that of the sixth embodiment, a description of this embodiment will be made only of the effects of the shielding plate 160 with reference to FIG. 20.

Figure 33:
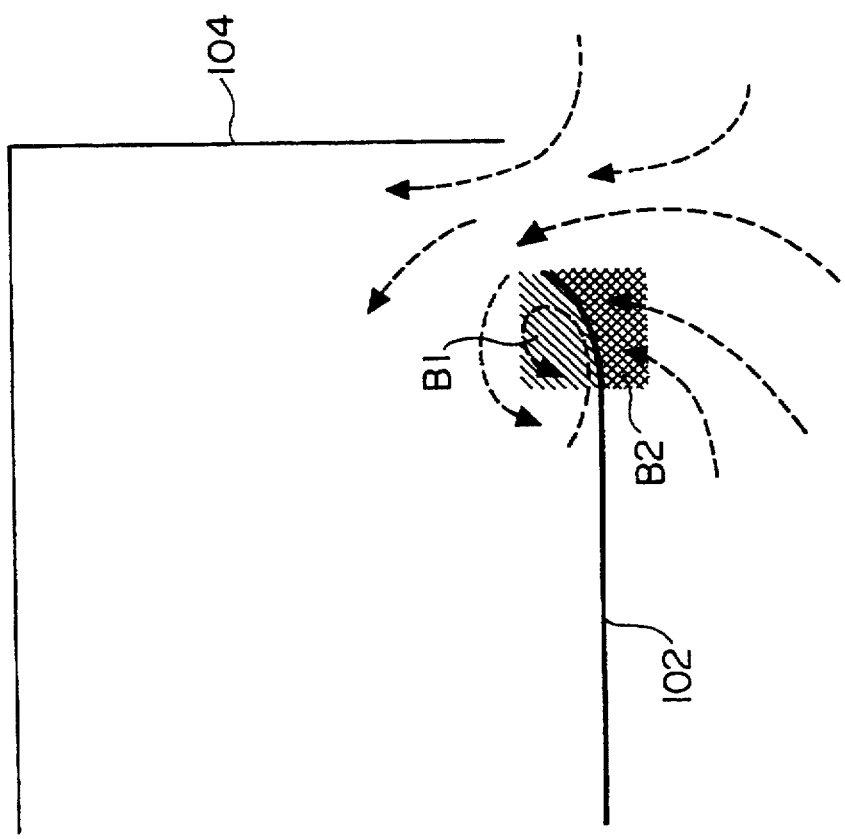
FIG. 33 is an illustration of an outside air inflow situation in a cross section along a line S—S of FIG. 31.

In the case of the prior example shown in FIG. 33, as mentioned before, the flow from the front surface becomes a main flow in the front surface opening section of the suction chamber 104, and therefore, because of the dynamic pressure at the B2 portion and the formation of the eddy due to the suction at the B1 portion, troubles arise in that the membrane 102 vibrates (rocks) or is taken into the interior of the suction chamber 104.

On the other hand, in this embodiment, as indicated with dotted arrows in FIG. 20, owing to the commutation effects of the shielding plate 160, the flow from the side surface becomes a main flow in the front surface opening section, and hence, the dynamic pressure or the formation of eddy is suppressible so-that the vibrations (rocking) of the membrane 2 or the introduction thereof into the suction chamber 40 are controllable, which allows the stable membrane formation irrespective of the kind of resin.

Particularly, this embodiment can fulfill great effects when the membrane 2 is stably brought closely into contact with the casting roll 3 in the case of using a resin with a relatively low extension viscosity for the membrane formation.

Besides, if the shielding plate 160 is shifted in accordance with the necking quantity of the membrane 2, the air flow is appropriately controllable.

[9] Description of Ninth Embodiment

Figure 21:
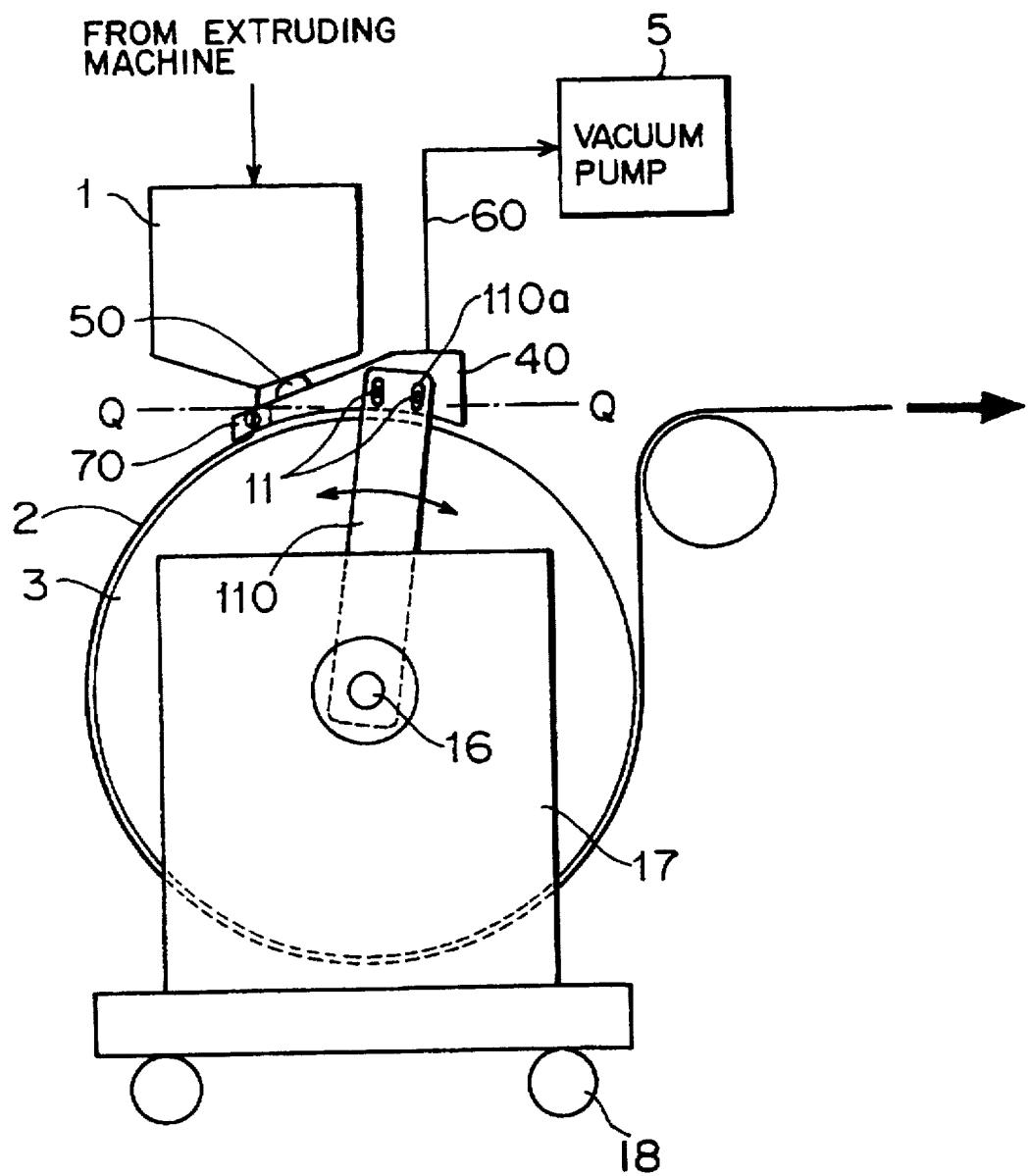
FIG. 21 is a side elevational view illustratively showing a casting apparatus for resin-made membrane formation according to a ninth embodiment of this invention.
Figure 22:
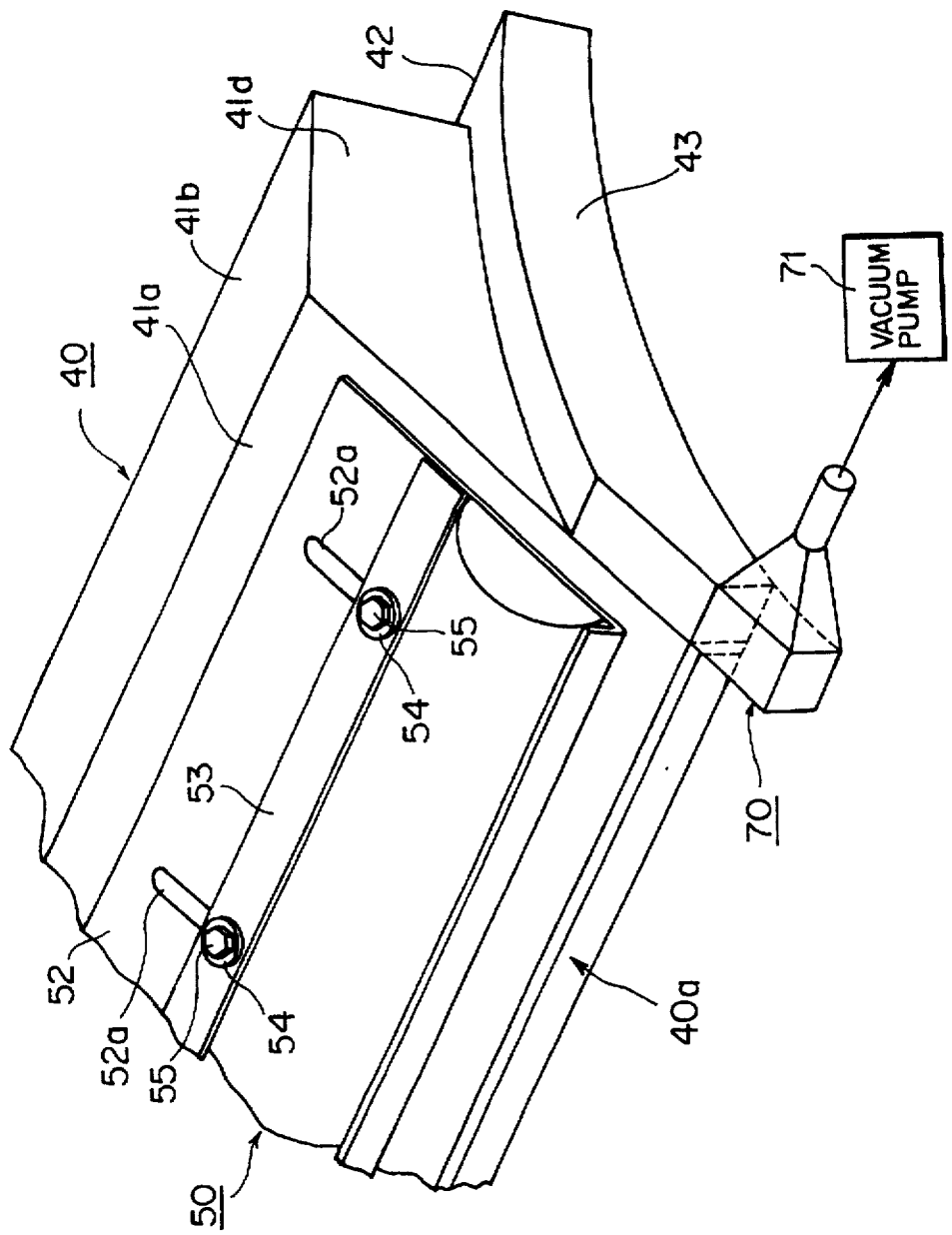
FIG. 22 is a perspective view showing structures and fitted conditions of an elastic seal member and a suction nozzle in the ninth embodiment.
Figure 23:
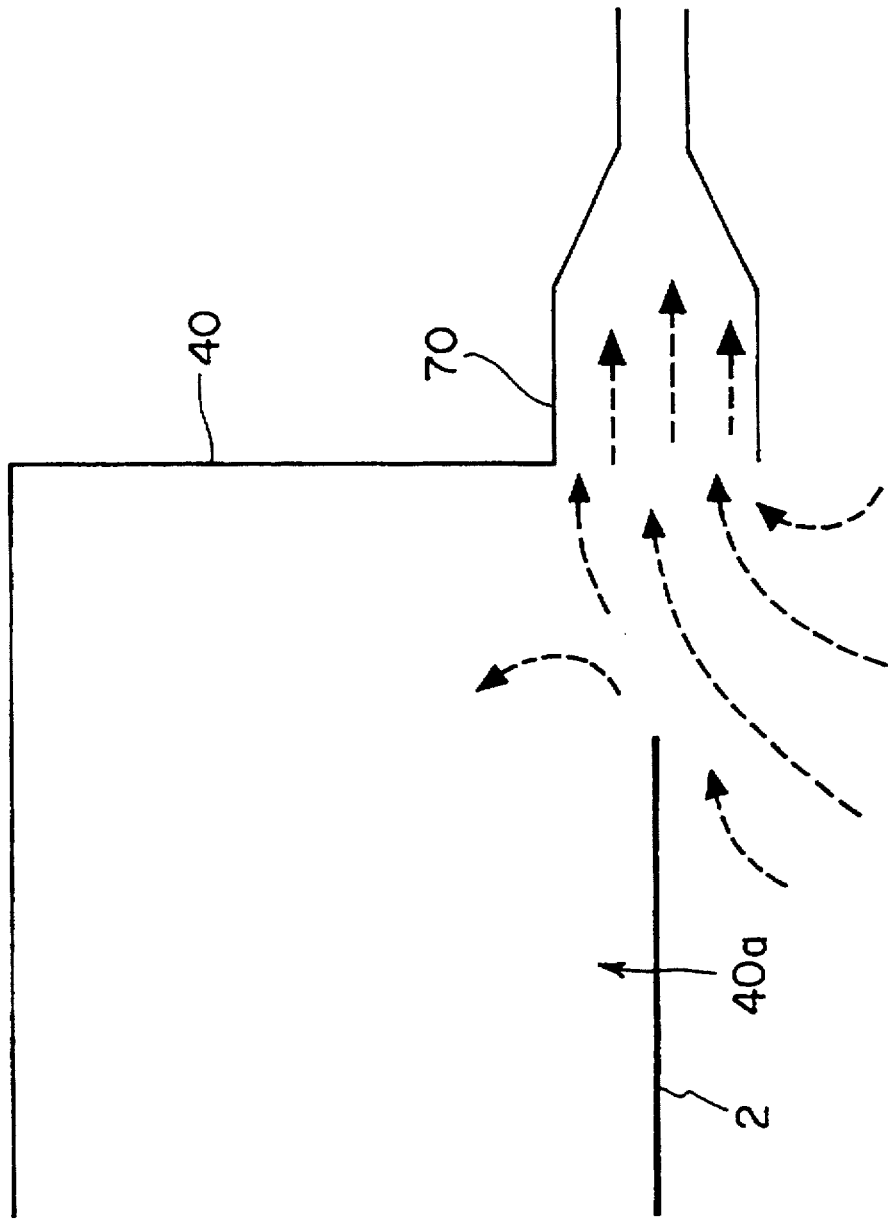
FIG. 23 is an illustration of an outside air inflow situation in a cross section along a line Q—Q of FIG. 21.

FIGS. 21 to 23 illustrate a casting apparatus for resin-made membrane formation according to a ninth embodiment of this invention. FIG. 21 is a side elevational view illustratively showing the apparatus, FIG. 22 is a perspective view showing structures and fitted conditions of an elastic seal member and a suction nozzle in the apparatus, and FIG. 23 is an illustration of an outside air inflow situation in a cross section taken along a line Q—Q of FIG. 21. The same numerals as those in the above explanation depict the same or corresponding parts, and the description thereof will be omitted.

This ninth embodiment is substantially constructed like the above-described sixth embodiment as shown in FIG. 21, except that, as shown in FIGS. 21 and 22, to an end portion of a suction inlet (suction opening section) 40a of a suction chamber 40, there is fitted a side suction nozzle 70 which sucks air from a side of the end portion. This side suction nozzle 70 is coupled to a vacuum pump 71 and the air at the end portion of the suction inlet 40a of the suction chamber 40 is sucked through the side suction nozzle 70 by the vacuum pump 71. Incidentally, although the FIG. 22 shows only one end portion of the apparatus according to this embodiment in the width directions, the other end portion side is constructed in a similar way.

Basically, the operation of the resin-made membrane formation casting apparatus according to the ninth embodiment thus arranged is the same as that of the sixth embodiment, and therefore, the description thereof to be made referring to FIG. 23 is limited to only the effects of the side suction nozzle 70.

In this embodiment, as indicated with dotted arrows in FIG. 23, owing to the suction operation of the side suction nozzle 70, the flow due to the suction by the side suction nozzle 70 is a main flow so that the dynamic pressure and the formation of eddy are suppressible and, hence, the vibrations (rocking) of the membrane 2 or the introduction thereof into the suction chamber 40 is suppressible, with the result that the stable membrane formation is feasible irrespective of the kind of resin.

Particularly, this embodiment can fulfill great effects when the membrane 2 is stably brought closely into contact with the casting roll 3 in the case of using a resin with a relatively low extension viscosity for the membrane formation.

Besides, if the air suction amounts into the suction chamber 40 and the side suction nozzle 70 by the vacuum pumps 5 and 71 are controlled respectively, the air flow is appropriately controllable.

[10] Description of Tenth Embodiment

Figure 24:
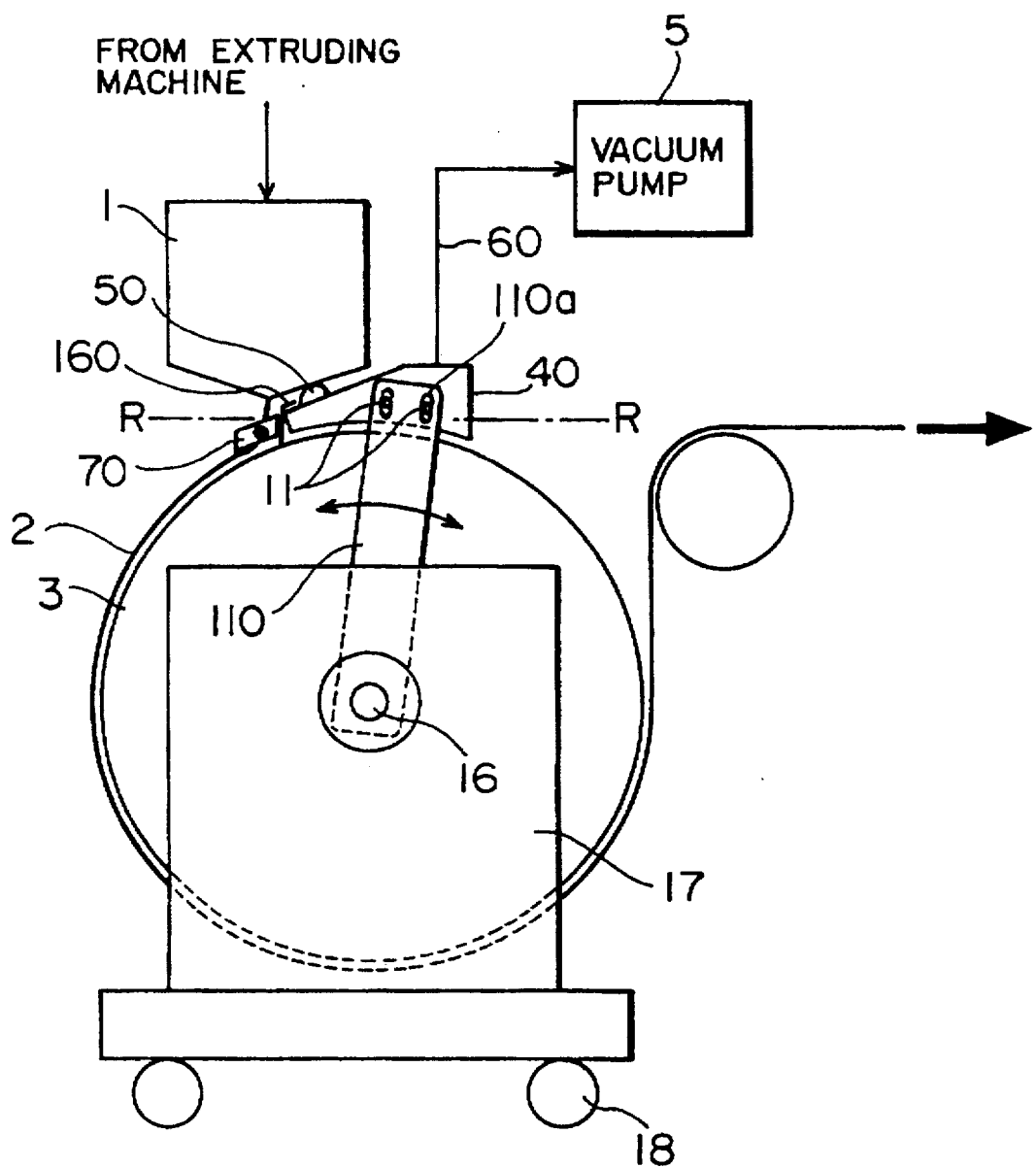
FIG. 24 is a side elevational view illustratively showing a casting apparatus for resin-made membrane formation according to a tenth embodiment of this invention.
Figure 25:
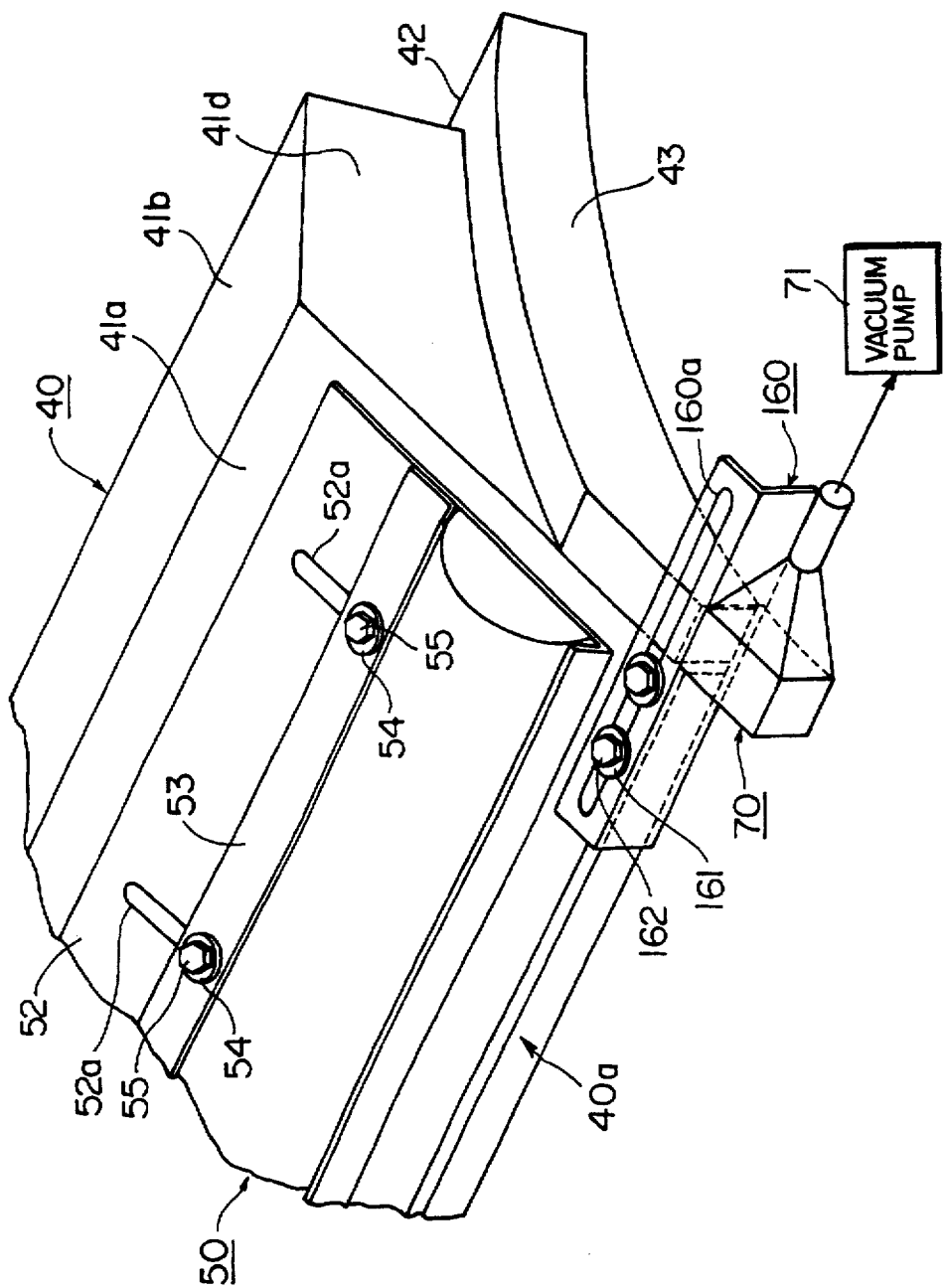
FIG. 25 is a perspective view showing structures and fitted conditions of an elastic seal member, a shielding plate and a suction nozzle in the tenth embodiment.
Figure 26:
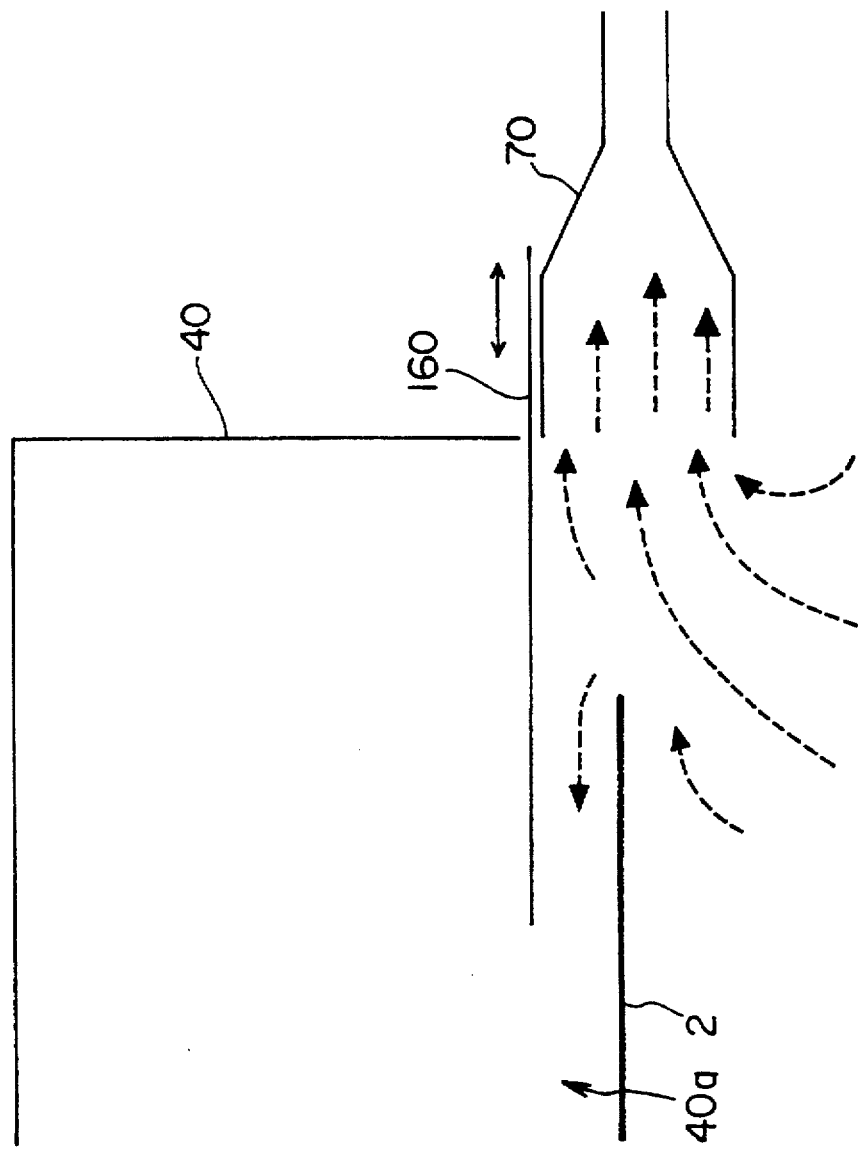
FIG. 26 is an illustration of an outside air inflow situation in a cross section along a line R—R of FIG. 24.

FIGS. 24 to 26 are illustrations of a casting apparatus for resin-made membrane formation according to a tenth embodiment of this invention. FIG. 24 is a side elevational view illustratively showing the apparatus, FIG. 25 is a perspective view showing structures and fitted conditions of an elastic seal member, a shielding plate and a suction nozzle in the apparatus, and FIG. 26 is an illustration of an outside air inflow situation in a cross section taken along a line R—R of FIG. 24. In the illustrations, the same numerals as those in the above explanation designate the same or corresponding parts, and the description thereof will be omitted.

This tenth embodiment has the substantially same structure as that of the above-described sixth embodiment as shown in FIG. 24, except that both a shielding plate 160 described in the eighth embodiment and side suction nozzle 70 described in the ninth embodiment are provided as shown in FIGS. 24 and 25.

In more detail, to an end portion of a suction inlet (suction opening section) 40a of a suction chamber 40 there is fitted the shielding plate 160 which shields that end portion opening to suppress the suction occurring through the end portion, with the shielding plate 160 being movable in the width directions of a membrane 2. Further, to this shielding plate 160 (that is, the end portion of the suction inlet 40a of the suction chamber 40), there is attached the side suction nozzle 70 which sucks air from a side of the end portion. This side suction nozzle 70 is coupled to a vacuum pump 71, so that the air at the end portion of the suction inlet 40a of the suction chamber 40 is sucked through the side suction nozzle 70 by means of the vacuum pump 71.

Furthermore, as well as the eighth embodiment, as shown in FIG. 25, an elongated hole 160a is made in the shielding plate 160, and the shielding plate 160 is fitted to the suction chamber 40 in a manner that fitting bolts 162 penetrate the elongated hole 160a and is tightened through washers 161 with respect to an upper wall 41a of the suction chamber 40. The shielding plate 160 is movable in the width directions of the membrane 2 owing to the elongated hole 160, thereby adjusting the shielding amount at the end portion of the suction inlet 40a of the suction chamber 40.

Incidentally, although the FIG. 25 shows only one end portion side of the apparatus according to this embodiment in the width directions, the other end portion side is constructed in a similar way.

Basically, the operation of the resin-made membrane formation casting apparatus according to the tenth embodiment thus constructed is the same as that of the sixth embodiment, and hence, the description will be made of only the effects of the shielding plate 160 and the side suction nozzle 70 with reference to FIG. 26.

In this embodiment, as indicated with dotted arrows in FIG. 26, owing to the suction operation of the side suction nozzle 70, the flow due to the suction by the side suction nozzle 70 is a main flow, and further the shielding plate 160 commutates the suction into the suction chamber 40, so that the dynamic pressure and the formation of eddy are suppressible and, hence, the vibrations (rocking) of the membrane 2 or the introduction thereof into the suction chamber 40 is suppressible, with the result that the stable membrane formation is feasible irrespective of the kind of resin.

Particularly, this embodiment can fulfill great effects when the membrane 2 is stably brought closely into contact with the casting roll 3 in the case of using a resin with a relatively low extension viscosity for the membrane formation.

Besides, if the air suction amounts into the suction chamber 40 and the side suction nozzle 70 by the vacuum pumps 5 and 71 are controlled respectively, the air flow is appropriately controllable.

[11] Description of Eleventh Embodiment

Figure 28:
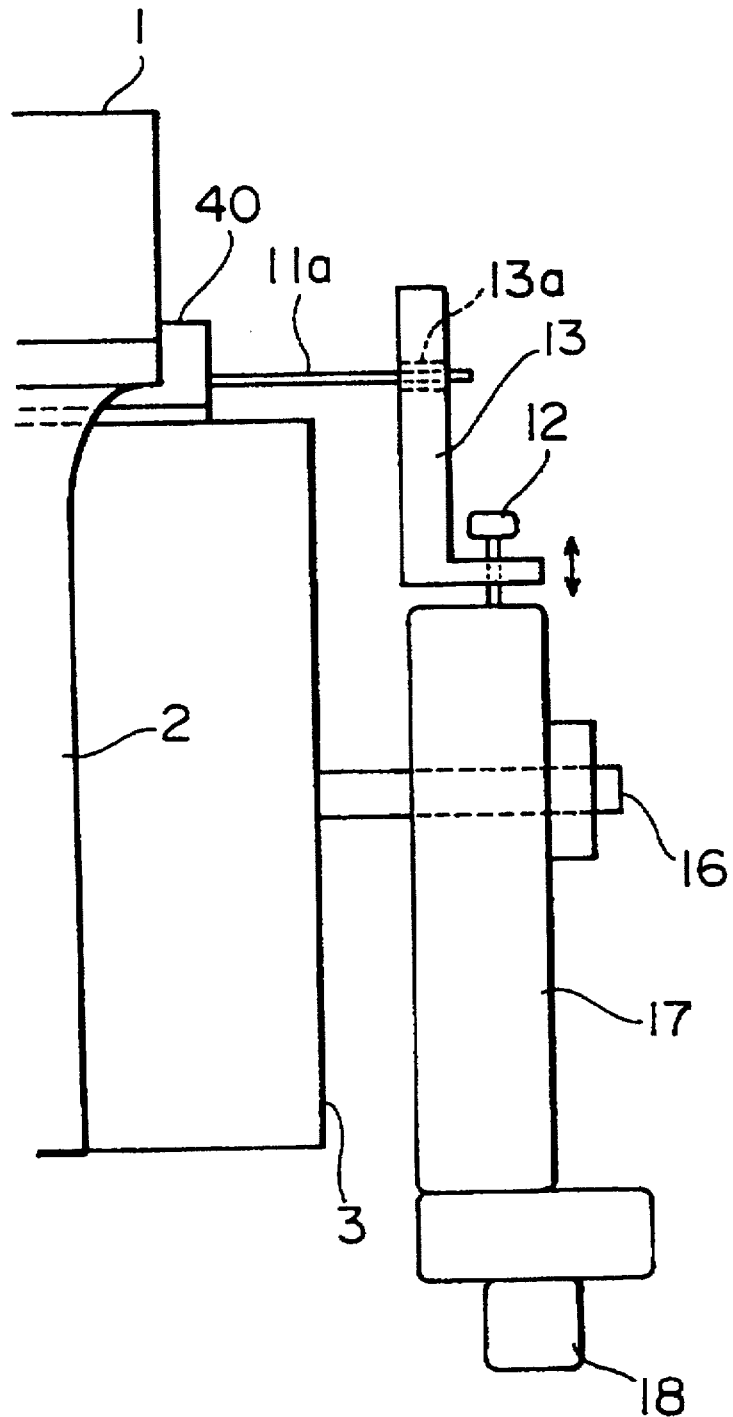
FIG. 28 is a front elevational view illustratively showing the casting apparatus for resin-made membrane formation according to the eleventh embodiment of this invention.

FIGS. 27 and 28 are respectively a side elevational view and a front elevational view each illustratively showing a casting apparatus for resin-made membrane formation according to an eleventh embodiment of this invention.

This eleventh embodiment relates to a resin-made membrane formation casting apparatus constructed in a manner that a radially moving mechanism for shifting a suction chamber 40 in radial directions of a casting roll 3 to adjust the seal gap therebetween to a necessary dimension is added to the above-described casting apparatus according to the second embodiment. In the illustrations, the same numerals as those in the above description designate the same or corresponding parts, and the description thereof will be omitted for brevity.

In the casting apparatus according to the eleventh embodiment, as shown in FIGS. 27 and 28, a guide frame (guide member) 13 is used as a circumferentially moving mechanism for shifting the suction chamber 40 in the circumferential directions of the casting roll 3 while keeping the necessary seal gap.

This guide frame 13 is fitted through fitting bolts 12 to a side frame 17 for rotatably supporting a side end portion of a roll supporting shaft 16 of the casting roll 3. This guide frame 13 has an elongated hole-like guide rail 13a made to engage with two pins (or rollers) 11a fitted onto a side surface of the suction chamber 40 to guide the suction chamber 40 along the circumferential directions of the casting roll 3.

Furthermore, in this embodiment, in a manner of adjusting the fitting height position of the guide frame 13 relative to the side frame 17 by the fitting bolts 12, the necessary seal gap between the outer circumferential surface of the casting roll 3 and the suction chamber 40 is adjustable. That is, the aforesaid fitting bolts 12 function as the radially moving mechanism.

Incidentally, although FIG. 28 shows only one end portion side of the apparatus according to this embodiment in the width directions, the other end portion side is arranged in a similar way.

Moreover, the interval between the lower surface of the T die 1 and the upper surface of the suction chamber 40 is closed with the above-mentioned elastic seal member 50 attached to the suction chamber 40.

The resin-made membrane formation casting apparatus according to the eleventh embodiment of this invention thus constructed differs from the sixth embodiment only in the constructions of the circumferentially moving mechanism and the radially moving mechanism, and can provide the same effects as those of the sixth embodiment.

Even in this eleventh embodiment, it is also possible to use the elastic seal member 50 or any one of the metallic plate springs 56a to 56c described in the fourth to seventh embodiments, and to use the shielding plate 160 or the side suction nozzle 70 described in the eighth to tenth embodiments.

[12] Description of Twelfth Embodiment

Figure 29:
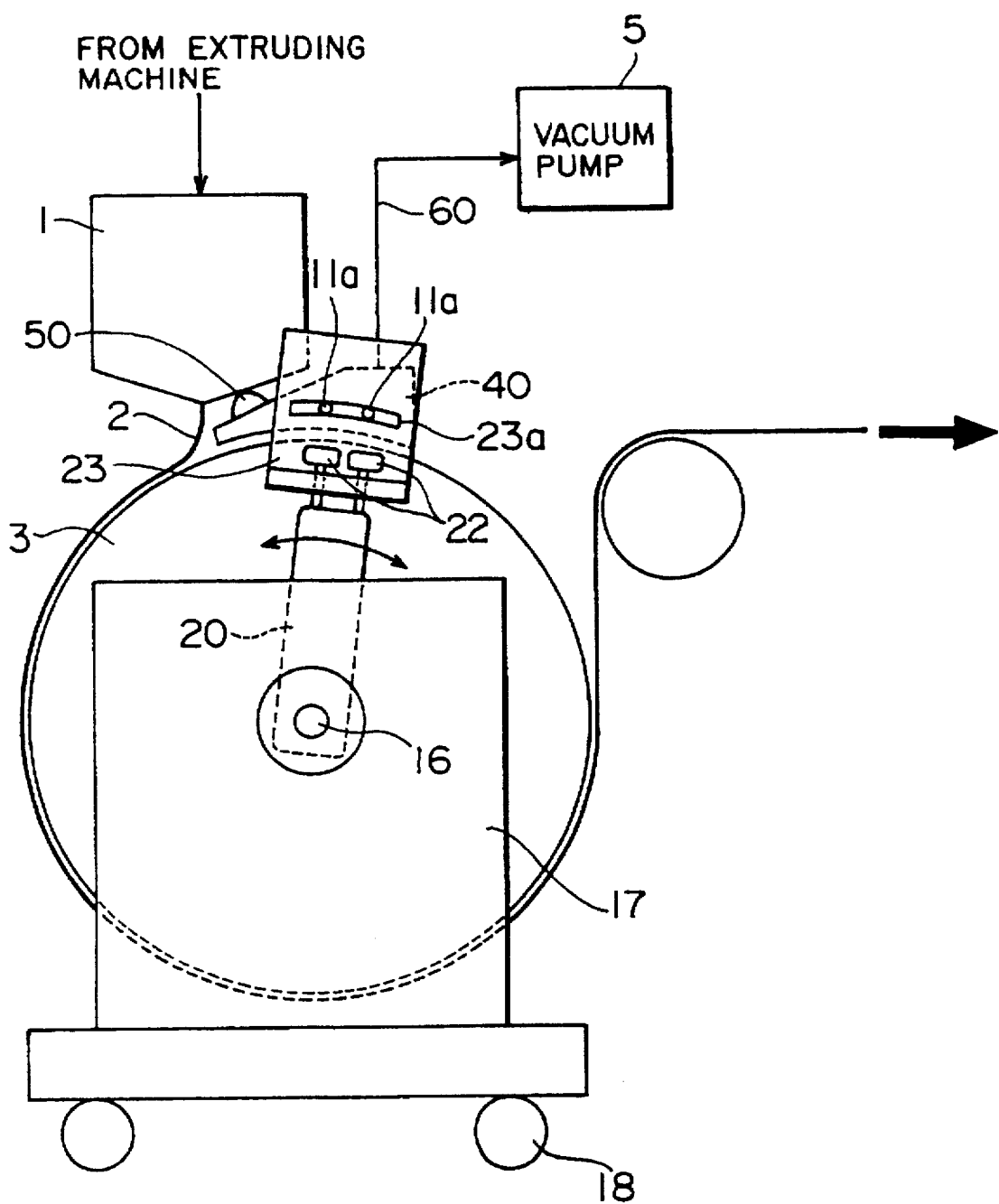
FIG. 29 is aside elevational view illustratively showing a casting apparatus for resin-made membrane formation according to a twelfth embodiment of this invention.
Figure 30:
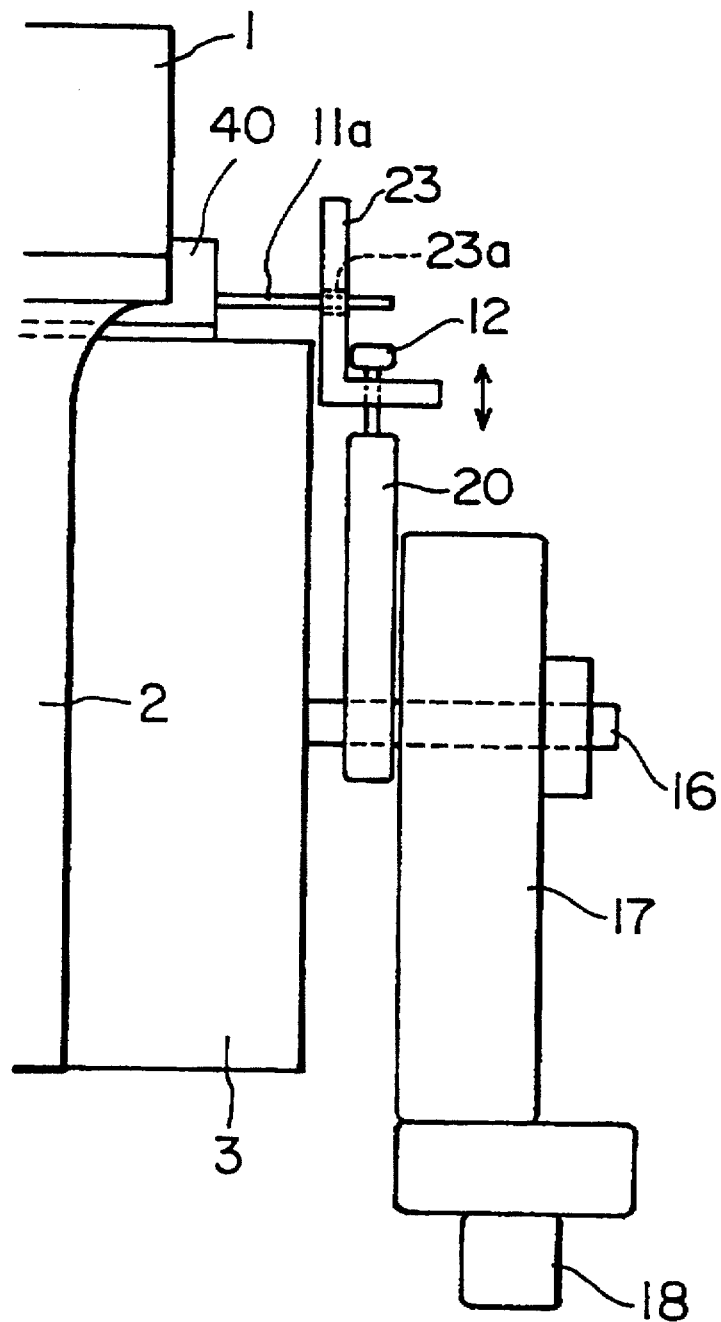
FIG. 30 is a front elevational view illustratively showing the casting apparatus for resin-made membrane formation according to the twelfth embodiment of this invention.
Figure 31:
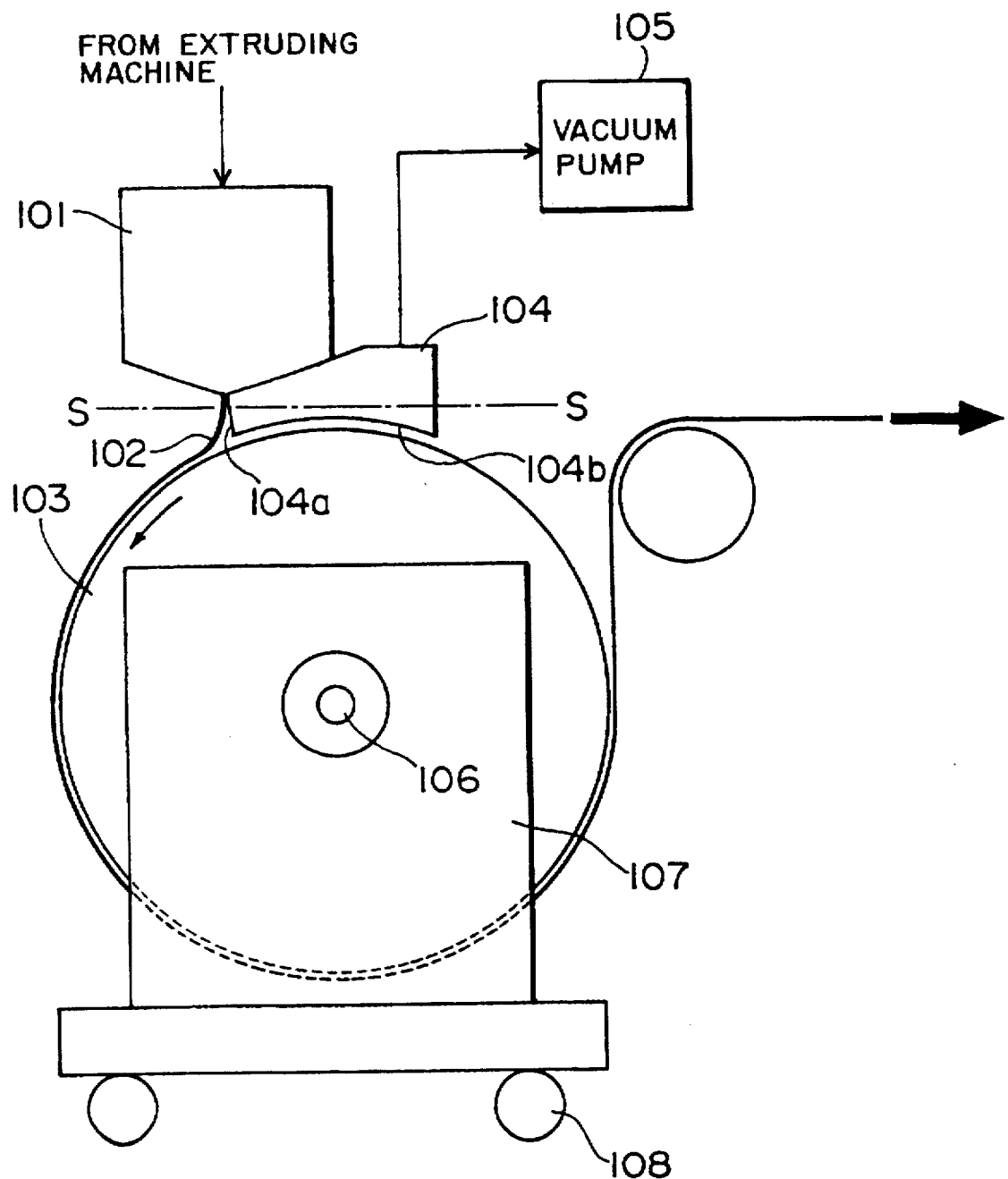
FIG. 31 is aside elevational view illustratively showing a casting apparatus for resin-made membrane formation in a prior art.
Figure 32:
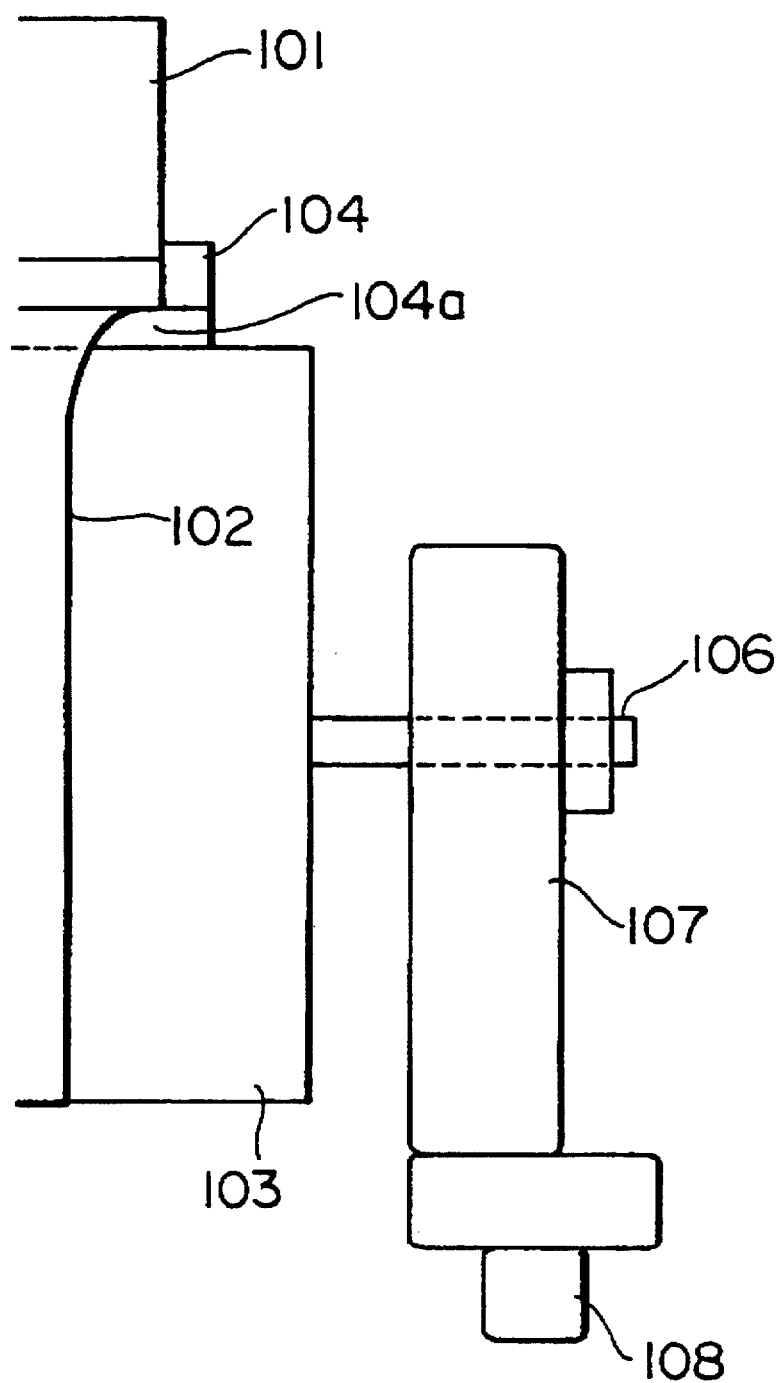
FIG. 32 is a front elevational view illustratively showing the casting apparatus for resin-made membrane formation in the prior art.

FIGS. 29 and 30 are respectively a side elevational view and a front elevational view illustratively showing a casting apparatus for resin-made membrane formation according to a twelfth embodiment of this invention.

In this twelfth embodiment, a radially moving mechanism for shifting a suction chamber 40 in radial directions of a casting roll 3 to adjust the seal gap therebetween to a necessary dimension is provided in the above-described casting apparatus according to the third embodiment. In the illustrations, the same numerals as those in the above explanation designate the same or corresponding components, and the description thereof will be omitted for simplicity.

In the casting apparatus according to the twelfth embodiment, as shown in FIGS. 29 and 30, a driving member 20 and a guide frame (guide member) 23 are used as a circumferentially moving mechanism for shifting the suction chamber 40 along the circumferential directions of the casting roll 3 while maintaining the necessary seal gap.

In this constitution, in the driving member 20, its proximal side is supported coaxially with a roll supporting shaft 16 of the casting roll 3 to be rotatable around the roll supporting shaft 16 while its tip side is attached through fitting bolts 22 to the guide frame 23. This guide frame 23 has an elongated hole-like guide rail 23a made to engage with two pins (or rollers) 11a, 11a fitted to a side surface of the suction chamber 40 to guide the suction chamber 40 along the circumferential directions of the casting roll 3.

Furthermore, in this embodiment, in a manner of adjusting the fitting height position of the guide frame 23 relative to the driving member 20 by the fitting bolts 22, the necessary seal gap between the outer circumferential surface of the casting roll 3 and the suction chamber 40 is adjustable. That is, the aforesaid fitting bolts 22 function as the radially moving mechanism.

Incidentally, although FIG. 30 shows only one end portion side of the apparatus according to this embodiment in the width directions, the other end portion side is arranged in a similar way.

Moreover, the interval between the lower surface of the T die 1 and the upper surface of the suction chamber 40 is closed with the above-mentioned elastic seal member 50 attached to the suction chamber 40.

In the resin-made membrane formation casting apparatus according to the twelfth embodiment of this invention thus constructed, as in the case of the third embodiment, in the case that the interval between the T die 1 and the casting roll 3 is large, a rough adjustment is made such that the suction chamber 40 is shifted by the driving member 20 counter-clockwise around the roll supporting shaft 16 to advance to an adequate position, and subsequently a fine adjustment is made such that the suction chamber 40 is shifted along the elongated hole-like guide rail 23a of the guide frame 23 to be positioned at a given position, thus positioning the suction inlet 40a of the suction chamber 40 in the vicinity of a close-contact starting portion between the membrane 2 and the casting roll 3.

On the contrary, in the case of the interval between the T die 1 and the casting roll 3 being small, the rough adjustment is made such that the suction chamber 40 is shifted by the driving member 20 clockwise around the roll supporting shaft 16 to retreat to an adequate position and, subsequently, the fine adjustment is made such that the suction chamber 40 is shifted along the elongated hole-like guide rail 23a of the guide frame 23 to be positioned at a given position.

This resin-made membrane formation casting apparatus according to the twelfth embodiment of this invention can offer the same effects as those of the third embodiment, and further, because of being different from the sixth embodiment only in the constructions of the circumferentially moving mechanism and the radially moving mechanism can provide the same effects as those of the sixth embodiment.

Even in this twelfth embodiment, it is also possible to use the elastic member 50 or any one of the metallic plate springs 56a to 56c described in the fourth to seventh embodiments, and to use the shielding plate 160 or the side suction nozzle 70 described in the eighth to tenth embodiments.

What is claimed is:

1. A casting apparatus for formation of a resin-made membrane comprising:
    a die for extruding a molten resin into a membrane;
    a cooling roll for receiving said membrane extruded from said die on its outer circumferential surface to deliver it while cooling; and
    a suction chamber for sucking air between said membrane and said cooling roll so that said membrane is brought closely into contact with a surface of said cooling roll, wherein said suction chamber is disposed separately from said die, and a support mechanism is further provided to support said suction chamber in such a manner that said suction chamber is movable along a circumferential direction of said cooling roll.

2. A casting apparatus for formation of a resin-made membrane as defined in claim 1, wherein said support mechanism is equipped with a rotary arm whose proximal side is supported by a rotary shaft of said cooling roll so that said rotary arm is rotatable thereabout said rotary arm being fixedly secured at its tip side to said suction chamber with said tip side spaced a distance from said rotary shaft.

3. A casting apparatus for formation of a resin-made membrane as defined in claim 1, wherein said support mechanism is equipped with an arcuate guide so as to guide said suction chamber along a circumferential direction of said cooling roll.

4. A casting apparatus for formation of a resin-made membrane as defined in claim 1, wherein said support mechanism is equipped with a rotary arm whose proximal side is supported by a rotary shaft of said cooling roll so that said rotary arm is rotatable thereabout, said rotary arm being secured at its tip side to said suction chamber with said tip side spaced a distance from said rotary shaft and said support mechanism being further equipped with an arcuate guide fitted to the tip side of said rotary arm so as to guide said suction chamber along a circumferential direction of said cooling roll.

5. A casting apparatus for formation of a resin-made membrane as defined in claim 1, wherein a seal member is elastic and interposed between a surface of said die, which surface confronts said cooling roll, and an outer surface of a ceiling plate of said suction chamber.

6. A casting apparatus for formation of a resin-made membrane as defined in claim 2, wherein a seal member is elastic and interposed between a surface of said die, which surface confronts said cooling roll, and an outer surface of a ceiling plate of said suction chamber.

7. A casting apparatus for formation of a resin-made membrane as defined in claim 3, wherein a seal member is elastic and interposed between a surface of said die, which surface confronts said cooling roll, and an outer surface of a ceiling plate of said suction chamber.

8. A casting apparatus for formation of a resin-made membrane as defined in claim 4, wherein a seal member is elastic and interposed between a surface of said die, which surface confronts said cooling roll, and an outer surface of a ceiling plate of said suction chamber.

9. A casting apparatus for formation of a resin-made membrane as defined in claim 5, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

10. A casting apparatus for formation of a resin-made membrane as defined in claim 6, wherein said seal member is disposed over the entire width of said membrane, and is composed of a bar like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

11. A casting apparatus for formation of a resin-made membrane as defined in claim 7, wherein said seal member is disposed over the entire width of said membrane, and is composed of a bar like seal body of a foaming agent a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

12. A casting apparatus for formation of a resin-made membrane as defined in claim 1, wherein said support mechanism is equipped with an adjustment mechanism for adjustably shifting said suction chamber radially of said cooling roll.

13. A casting apparatus for formation of a resin-made membrane as defined in claim 12, wherein said support mechanism is equipped with a rotary arm whose proximal side is supported by a rotary shaft of said cooling roll so that said rotary arm is rotatable thereabout said rotary arm being secured at its tip side to said suction chamber with said tip side spaced a distance from said rotary shaft, said adjustment mechanism is provided at a portion at which said suction chamber is fitted to said rotary arm.

14. A casting apparatus for formation of a resin-made membrane as defined in claim 12, wherein said support mechanism is equipped with an arcuate guide so as to guide said suction chamber along a circumferential direction of said cooling roll, said adjustment mechanism being operable to move said guide in a radial direction of said cooling roll.

15. A casting apparatus for formation of a resin-made membrane as defined in claim 12, wherein said support mechanism is equipped with a rotary arm whose proximal side is supported by a rotary shaft of said cooling roll so that said rotary arm is rotatable thereabout, said rotary arm being secured at its tip side to said suction chamber with said tip side spaced a distance from said rotary shaft and, said support mechanism being further equipped with an arcuate guide fitted to the tip side of said rotary arm so as to guide said suction chamber along a circumferential direction of said cooling roll, said support mechanism is provided at a portion at which said guide is attached to said rotary arm.

16. A casting apparatus for formation of a resin-made membrane as defined in claim 12, wherein member is elastic and interposed between a surface of said die, which surface confronts said cooling roll and an outer surface of a ceiling plate of said suction chamber.

17. A casting apparatus for formation of a resin-made membrane as defined in claim 12, wherein a seal member is elastic and interposed between a surface of said die, which surface confronts said cooling roll, and an outer surface of a ceiling plate of said suction chamber.

18. A casting apparatus for formation of a resin-made membrane as defined in claim 14, wherein a seal member is elastic and interposed between a surface of said die, which surface confronts said cooling roll, and an outer surface of a ceiling plate of said suction chamber.

19. A casting apparatus for formation of a resin-made membrane as defined in claim 15, wherein a seal member is elastic and interposed between a surface of said die, which surface confronts said cooling roll and an outer surface of a ceiling plate of said suction chamber.

20. A casting apparatus for formation of a resin-made membrane as defined in claim 16, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

21. A casting apparatus for formation of a resin-made membrane as defined in claim 16, where in said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

22. A casting apparatus for formation of a resin-made membrane as defined in claim 16, wherein said suction chamber has a suction opening and is equipped with a suction port disposed in one side wall of said suction chamber near said suction opening for sucking air from one end portion of said suction opening.

23. A casting apparatus for formation of a resin-made membrane as defined in claim 17, wherein said suction chamber has a suction opening and is equipped with a suction port disposed in one side wall of said suction chamber near said suction opening for sucking air from one end portion of said suction opening.

24. A casting apparatus for formation of a resin-made membrane as defined in claim 18, wherein said suction chamber has a suction opening and is equipped with a suction port disposed in one side wall of said suction chamber near said suction opening for sucking air from one end portion of said suction opening.

25. A casting apparatus for formation of a resin-made membrane as defined in claim 19, wherein said suction chamber has a suction opening and is equipped with a suction port disposed in one side wall of said suction chamber near said suction opening for sucking air from one end portion of said suction opening.

26. A casting apparatus for formation of a resin-made membrane as defined in claim 16, wherein said suction chamber has a suction opening and is equipped with a shielding plate for partially shielding said suction opening of said suction chamber, said shielding plate being movable with respect to said suction chamber transversely of said membrane, said section chamber being further equipped with a suction port disposed near said suction opening for sucking air from one end portion of said suction opening.

27. A casting apparatus for formation of a resin-made membrane as defined in claim 17, wherein said suction chamber has a suction opening and is equipped with a shielding plate for partially shielding said suction opening of said suction chamber, said shielding plate being movable with respect to said suction chamber transversely of said membrane, said section chamber being further equipped with a suction port disposed near said suction opening for sucking air from one end portion of said suction opening.

28. A casting apparatus for formation of a resin-made membrane as defined in claim 18, wherein said suction chamber has a suction opening and is equipped with a shielding plate for partially shielding said suction opening of said suction chamber, said shielding plate being movable with respect to said suction chamber transversely of said membrane, said section chamber being further equipped with a suction port disposed near said suction opening for sucking air from one end portion of said suction opening.

29. A casting apparatus for formation of a resin-made membrane as defined in claim 19, wherein said suction chamber has a suction opening and is equipped with a shielding plate for partially shielding said suction opening of said suction chamber, said shielding plate being movable with respect to said suction chamber transversely of said membrane, said section chamber being further equipped with a suction port disposed near said suction opening for sucking air from one end portion of said suction opening.

30. A casting apparatus for formation of a resin-made membrane comprising:
   a die for extruding a molten resin into a membrane;
   a cooling roll for receiving said membrane extruded from said die on its outer circumferential surface to deliver it while cooling; and a suction chamber for sucking air between said membrane and said cooling roll so that said membrane is brought closely into contact with a surface of said cooling roll,
   wherein said suction chamber has a suction opening and is equipped with a shielding plate for partially shielding said suction opening of said suction chamber, and
   wherein said suction chamber is disposed separately from said die, and a support mechanism is further provided to support said suction chamber in such a manner that said suction chamber is movable along a circumferential direction of said cooling roll.

31. A casting apparatus for formation of a resin-made membrane as defined in claim 30, wherein said support mechanism is equipped with a rotary arm whose proximal side is supported by a rotary shaft of said cooling roll so that said rotary arm is rotatable thereabout, said rotary arm being fixedly secured at its tip side to said suction chamber with said tip side spaced a distance from said rotary shaft.

32. A casting apparatus for formation of a resin-made membrane as defined in claim 30, wherein said support mechanism is equipped with an arcuate guide so as to guide said suction chamber along a circumferential direction of said cooling roll.

33. A casting apparatus for formation of a resin-made membrane as defined in claim 30, wherein said support mechanism is equipped with a rotary arm whose proximal side is supported by a rotary shaft of said cooling roll so that said rotary arm is rotatable thereabout, said rotary arm being secured at its tip side to said suction chamber with said tip side spaced a distance from said rotary shaft and further equipped with an arcuate guide attached to a tip side of said rotary arm so as to guide said suction chamber along a circumferential direction of said cooling roll.

34. A casting apparatus for formation of a resin-made membrane as defined in claim 30, wherein a seal member is elastic and interposed between a surface of said die, which surface confronts said cooling roll, and an outer surface of a ceiling plate of said suction chamber.

35. A casting apparatus for formation of a resin-made membrane as defined in claim 31, wherein a seal member is elastic and interposed between a surface of said die, which surface confronts said cooling roll, and an outer surface of a ceiling plate of said suction chamber.

36. A casting apparatus for formation of a resin-made membrane as defined in claim 32, wherein a seal member is elastic and interposed between a surface of said die, which surface confronts said cooling roll, and an outer surface of a ceiling plate of said suction chamber.

37. A casting apparatus for formation of a resin-made membrane as defined in claim 33, wherein a seal member is elastic and interposed between a surface of said die, which surface confronts said cooling roll, and an outer surface of a ceiling plate of said suction chamber.

38. A casting apparatus for formation of a resin-made membrane as defined in claim 34, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

39. A casting apparatus for formation of a resin-made membrane as defined in claim 35, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

40. A casting apparatus for formation of a resin-made membrane as defined in claim 36, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

41. A casting apparatus for formation of a resin-made membrane as defined in claim 37, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

42. A casting apparatus for formation of a resin-made membrane as defined in claim 34, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

43. A casting apparatus for formation of a resin-made membrane as defined in claim 35, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

44. A casting apparatus for formation of a resin-made membrane as defined in claim 36, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

45. A casting apparatus for formation of a resin-made membrane as defined in claim 37, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

46. A casting apparatus for formation of a resin-made membrane as defined in claim 30, wherein said support mechanism is equipped with an adjustment mechanism for adjustably shifting said suction chamber radially of said cooling roll.

47. A casting apparatus for formation of a resin-made membrane as defined in claim 46, wherein said support mechanism is equipped with a rotary arm whose proximal side is supported by a rotary shaft of said cooling roll so that said rotary arm is rotatable thereabout, said rotary arm being secured at its tip side to said suction chamber with said tip side spaced a distance from said rotary shaft, said adjustment mechanism is provided a portion at which said suction chamber is fitted to said rotary arm.

48. A casting apparatus for formation of a resin-made membrane as defined in claim 46, wherein said support mechanism is equipped with an arcuate guide so as to guide said suction chamber along a circumferential direction of said cooling roll, said adjustment mechanism being operable to move said guide in a radial direction of said cooling roll.

49. A casting apparatus for formation of a resin-made membrane as defined in claim 46, wherein said support mechanism is equipped with a rotary arm whose proximal side is supported, by a rotary shaft of said cooling roll so that said rotary arm is rotatable thereabout, said rotary arm being secured at its tip side to said suction chamber with said tip side spaced a distance from said rotary shaft and, said support mechanism being further equipped with an arcuate guide attached to the tip side of said rotary arm so as to guide said suction chamber along a circumferential direction of said cooling roll, said support mechanism is provided a portion at which said guide is attached to said rotary arm.

50. A casting apparatus for formation of a resin-made membrane as defined in claim 46, wherein a seal member is elastic and interposed between a surface of said die, which surface confronts said cooling roll, and an outer surface of a ceiling plate of said suction chamber.

51. A casting apparatus for formation of a resin-made membrane as defined in claim 47, wherein a seal member is elastic and interposed between a surface of said die, which surface confronts said cooling roll, and an outer surface of a ceiling plate of said suction chamber.

52. A casting apparatus for formation of a resin-made membrane as defined in claim 48, wherein a seal member is elastic and interposed between a surface of said die, which surface confronts said cooling roll, and an-outer surface of a ceiling plate of said suction chamber.

53. A casting apparatus for formation of a resin-made membrane as defined in claim 49, wherein a seal member is elastic and interposed between a surface of said die, which surface confronts said cooling roll, and an outer surface of a ceiling plate of said suction chamber.

54. A casting apparatus for formation of a resin-made membrane as defined in claim 50, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

55. A casting apparatus for formation of a resin-made membrane as defined in claim 51, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

56. A casting apparatus for formation of a resin-made membrane as defined in claim 52, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

57. A casting apparatus for formation of a resin-made membrane as defined in claim 53, wherein said seal member is disposed over the entire width of said membrane, and is composed of a bar-like seal body of a foaming agent, a glass cloth coated with an aluminum foil and covering the entire surface of said seal body, a fixture for fixing said seal body to one of said suction chamber and said die, said seal member serving to close a gap between said die and said suction chamber in a manner that said seal body is pressed against the other one of said suction chamber and said die under its own elasticity.

58. A casting apparatus for formation of a resin-made membrane as defined in claim 50, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

59. A casting apparatus for formation of a resin-made membrane as defined in claim 51, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

60. A casting apparatus for formation of a resin-made membrane as defined in claim 52, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

61. A casting apparatus for formation of a resin-made membrane as defined in claim 53, wherein said elastic seal member is disposed over the entire width of said membrane, and is in the form of a corrosion-resistant metallic plate spring which is attached to one of said suction chamber and said die, so as to close a gap between said die and said suction chamber in a manner that said metallic plate spring is pressed against the other one of said suction chamber and said die under its own elasticity.

62. A casting apparatus for formation of a resin-made membrane as defined in claim 3, wherein said arcuate guide is attached to a side frame pivotally supported at least on opposite ends of said cooling roll.

63. A casting apparatus for formation of a resin-made membrane as defined in claim 32, wherein said arcuate guide is attached to a side frame pivotally supported at least on opposite ends of said cooling roll.

64. A casting apparatus for formation of a resin-made membrane comprising:

a die for extruding a molten resin into a membrane;

a cooling roll for receiving said membrane extruded from said die on its outer circumferential surface to deliver it while cooling; and a suction chamber having a suction opening disposed adjacent said membrane, said suction opening extending laterally across said outer circumferential surface of said cooling roll for sucking air between said membrane and said cooling roll so that said membrane is brought closely into contact with said circumferential surface of said cooling roll, wherein said suction opening extending laterally with respect to said outer circumferential surface of said cooling roll is equipped with a shielding plate for restricting the lateral extent of said suction opening of said suction chamber, and wherein said shielding plate is selectively movable laterally with respect to said opening in suction chamber to thereby selectively vary the effective length of said suction opening.

65. A casting apparatus for formation of a resin-made membrane comprising:

a die for extruding a molten resin into a membrane;

a cooling roll for receiving said membrane extruded from said die on its outer circumferential surface to deliver it while cooling; and a suction chamber for sucking air between said membrane and said cooling roll so that said membrane is brought closely into contact with a surface of said cooling roll, wherein said suction chamber has a suction opening extending laterally with respect to said outer circumferential surface of said cooling roll and is equipped with a suction nozzle disposed in a side wall of said suction chamber adjacent said suction opening for sucking air from a lateral end portion of said suction opening.

66. A casting apparatus for formation of a resin-made membrane comprising:

a die for extruding a molten resin into a membrane;

a cooling roll for receiving said membrane extruded from said die on its outer circumferential surface to deliver it while cooling; and a suction chamber for sucking air between said membrane and said cooling roll so that said membrane is brought closely into contact with a surface of said cooling roll, wherein said suction chamber has a suction opening and is equipped with a shielding plate for partially shielding said suction opening of said suction chamber, said shielding plate being laterally movable with respect to said opening in said suction chamber, said suction chamber being further equipped with a suction nozzle disposed adjacent said suction opening for sucking air from a lateral end portion of said suction opening.

* * * * *